United States Patent
Nakagawa et al.

(10) Patent No.: US 11,151,733 B2
(45) Date of Patent: Oct. 19, 2021

(54) DETECTION DEVICE, INFORMATION PROCESSING DEVICE, DETECTION METHOD, STORAGE MEDIUM, AND DETECTION SYSTEM

(71) Applicant: NIKON CORPORATION, Tokyo (JP)

(72) Inventors: Yoshihiro Nakagawa, Tokyo (JP); Takeaki Sugimura, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 152 days.

(21) Appl. No.: 16/125,264

(22) Filed: Sep. 7, 2018

(65) Prior Publication Data

US 2019/0005666 A1 Jan. 3, 2019

Related U.S. Application Data

(63) Continuation of application No. PCT/JP2017/008165, filed on Mar. 1, 2017.

(30) Foreign Application Priority Data

Mar. 9, 2016 (JP) .............................. JP2016-045829

(51) Int. Cl.
*G06T 7/507* (2017.01)
*G06T 7/536* (2017.01)
(Continued)

(52) U.S. Cl.
CPC .............. *G06T 7/507* (2017.01); *G01B 11/00* (2013.01); *G06K 9/00201* (2013.01); *G06T 7/00* (2013.01);
(Continued)

(58) Field of Classification Search
CPC ......... G06T 7/507; G06T 7/536; G06T 7/543; G06T 7/00; G06T 7/40; G01B 11/00; G06K 9/00201
See application file for complete search history.

(56) References Cited

U.S. PATENT DOCUMENTS 6,091,420 A * 7/2000 Horikawa ............... G06T 15/00
345/419
7,137,556 B1 * 11/2006 Bonner ..................... B07C 3/14
235/462.08
(Continued)

FOREIGN PATENT DOCUMENTS

JP H06-34343 A 2/1994
JP H10-172003 A 6/1998
(Continued)

OTHER PUBLICATIONS

Barua, Souptik, "Rethinking Image Compression for the Object Detection Task", Rice University, Houston Texas, pp. 1-77, (Oct. 2015).

(Continued)

*Primary Examiner* — Qun Shen
(74) *Attorney, Agent, or Firm* — Oliff PLC

(57) ABSTRACT

A detection device includes: a detector that detects an object from one viewpoint; an reliability calculator that calculates reliability information on the object from the one viewpoint; an information calculator that uses detection results of the detector to calculate model information including at least one of shape information and texture information, on the object, from the one viewpoint; and an information processor that uses first object information including the model information or source data used for generation of the model information, and the reliability information, so as to generate second object information having a reduced data amount of the model information or the source data.

16 Claims, 26 Drawing Sheets

(51) Int. Cl.
  *G06T 7/543* (2017.01)
  *G06T 7/40* (2017.01)
  *G01B 11/00* (2006.01)
  *G06K 9/00* (2006.01)
  *G06T 7/00* (2017.01)

(52) U.S. Cl.
  CPC ............... *G06T 7/40* (2013.01); *G06T 7/536* (2017.01); *G06T 7/543* (2017.01); *G06T 2207/10028* (2013.01)

(56) References Cited

U.S. PATENT DOCUMENTS

| | | | |
|---|---|---|---|
| 2002/0080148 A1 | 6/2002 | Uchino | |
| 2003/0038812 A1* | 2/2003 | Bartell | G01N 27/44717 345/581 |
| 2003/0235338 A1* | 12/2003 | Dye | G06T 9/00 382/232 |
| 2004/0105573 A1 | 6/2004 | Neumann et al. | |
| 2004/0183940 A1 | 9/2004 | Raskar | |
| 2006/0067573 A1* | 3/2006 | Parr | G06K 9/00 382/154 |
| 2006/0092403 A1* | 5/2006 | Dralle | G01B 11/00 356/71 |
| 2007/0296979 A1 | 12/2007 | Morimoto et al. | |
| 2009/0041364 A1 | 2/2009 | On | |
| 2010/0238182 A1 | 9/2010 | Geisner et al. | |
| 2012/0162220 A1 | 6/2012 | Sakurai et al. | |
| 2012/0257016 A1 | 10/2012 | Nakajima et al. | |
| 2012/0320053 A1* | 12/2012 | Miyatani | G06T 7/75 345/420 |
| 2013/0070068 A1* | 3/2013 | Garvey, III | G01C 15/00 348/61 |
| 2013/0121564 A1 | 5/2013 | Kitamura et al. | |
| 2014/0028799 A1 | 1/2014 | Kuffner et al. | |
| 2014/0037194 A1 | 2/2014 | Kitamura et al. | |
| 2014/0105506 A1* | 4/2014 | Drost | G06K 9/00201 382/199 |
| 2014/0225985 A1 | 8/2014 | Klusza et al. | |
| 2014/0286536 A1 | 9/2014 | Pettersson et al. | |
| 2015/0055085 A1 | 2/2015 | Fonte et al. | |
| 2015/0154782 A1 | 6/2015 | Geisner et al. | |
| 2016/0261793 A1* | 9/2016 | Sivan | G06K 9/00228 |
| 2017/0069125 A1 | 3/2017 | Geisner et al. | |
| 2018/0054604 A1* | 2/2018 | Boyd | G06T 7/70 |

FOREIGN PATENT DOCUMENTS

| | | |
|---|---|---|
| JP | 2001-043496 A | 2/2001 |
| JP | 2002-031513 A | 1/2002 |
| JP | 2002-150315 A | 5/2002 |
| JP | 2004-191243 A | 7/2004 |
| JP | 2005-341569 A | 12/2005 |
| JP | 2006-295582 A | 10/2006 |
| JP | 2008-002995 A | 1/2008 |
| JP | 2009-168536 A | 7/2009 |
| JP | 2010-109783 A | 5/2010 |
| JP | 2010-134546 A | 6/2010 |
| JP | 2011-027707 A | 2/2011 |
| JP | 2012-013660 A | 1/2012 |
| JP | 2012-142791 A | 7/2012 |
| JP | 2012-521038 A | 9/2012 |
| JP | 5022508 B1 | 9/2012 |
| JP | 2012-221128 A | 11/2012 |
| JP | 2013-101464 A | 5/2013 |
| JP | 2014-025935 A | 2/2014 |
| JP | 2014-132219 A | 7/2014 |
| JP | 2014-225301 A | 12/2014 |
| WO | 2010/107575 A2 | 9/2010 |

OTHER PUBLICATIONS

Salem, Mohammed A-Megeed et al., "Resolution Mosaic-Based Smart Camera for Video Surveillance", IEEE, pp. 978-1-978-7, (2009).
Nov. 12, 2019 Office Action issued in Japanese Patent Application No. 2018-504411.
Sep. 30, 2019 Extended Search Report issued in European Patent Application No. 17763046.4.
May 26, 2020 Office Action issued in Japanese Patent Application No. 2018-504411.
May 9, 2017 Search Report issued in International Patent Application No. PCT/JP2017/008165.
May 9, 2017 Written Opinion issued in International Patent Application No. PCT/JP2017/008165.
Dec. 16, 2014 International Search Report issued in International Patent Application No. PCT/JP2014/073266.
Mar. 7, 2017 International Preliminary Report on Patentability issued in International Patent Application No. PCT/JP2014/073266.
Nov. 30, 2017 Notification of Reasons for Refusal issued in Japanese patent application 2016-546255.
Feb. 23, 2018 Extended European Search Report issued in European patent application No. 14901137.1.
Jan. 2, 2019 Office Action issued in European Patent Application No. 14901137.1.
Apr. 25, 2019 Office Action issued in U.S. Appl. No. 15/445,561.
Nov. 1, 2019 Office Action issued in U.S. Appl. No. 15/445,561.
Oct. 29, 2019 Office Action issued in Japanese Patent Application No. 2018-242899.
Nov. 18, 2019 Office Action issued in European Patent Application No. 14 901 137.1.
Feb. 14, 2020 Office Action issued in U.S. Appl. No. 15/445,561.
May 28, 2020 Office Action issued in U.S. Appl. No. 15/445,561.
Jul. 7, 2020 Office Action issued in Japanese Patent Application No. 2018-242899.
Sep. 29, 2020 Office Action issued in U.S. Appl. No. 15/445,561.
Mar. 30, 2021 Decision of Refusal issued in Japanese Patent Application No. 2018-242899.
Mar. 30, 2021 Decision of Dismissal of Amendment issued in Japanese Patent Application No. 2018-242899.
Feb. 24, 2021 Office Action issued in U.S. Appl. No. 15/445,561.
U.S. Appl. No. 15/445,561, filed Feb. 28, 2017 in the name of Sugimura et al.
May 21, 2021 Notice of Allowance issued in U.S. Appl. No. 15/445,561.
Feb. 23, 2021 Office Action issued in European Patent Application No. 17 763 046.4.
Jun. 30, 2021 Notice of Allowance in U.S. Appl. No. 15/445,561.

* cited by examiner

DETECTION DEVICE, INFORMATION PROCESSING DEVICE, DETECTION METHOD, STORAGE MEDIUM, AND DETECTION SYSTEM

CROSS REFERENCE TO RELATED APPLICATION

This is a Continuation of PCT Application No. PCT/JP2017/008165, filed on Mar. 1, 2017. The contents of the above-mentioned application are incorporated herein by reference.

FIELD OF THE INVENTION

The present invention relates to a detection device, an information processing device, a detection method, a storage medium, and a detection system.

BACKGROUND

A technique in which an object is detected by a plurality of imaging devices and a plurality of obtained images are input to a computer to acquire a three-dimensional shape of the object has been developed (see, for example, Patent Literature 1).

CITATION LIST

Patent Literature

[Patent Literature 1] Japanese Unexamined Patent Application Publication No. 2010-134546

In the above-mentioned technique, it is desired to easily process model information including at least one of shape information and texture information on an object or information used for generation of model information.

SUMMARY

A first aspect of the present invention provides a detection device, including: a detector that detects an object from one viewpoint; an reliability calculator that calculates reliability information on the object from the one viewpoint; an information calculator that uses detection results of the detector to calculate model information including at least one of shape information and texture information on the object from the one viewpoint; and an information processor that uses first object information including the model information or source data used for generation of the model information, and the reliability information, so as to generate second object information having a reduced data amount of the model information or the source data.

A second aspect of the present invention provides an information processing device that uses first object information including model information, including at least one of shape information and texture information on an object obtained by detecting the object from one viewpoint, or source data used for generation of the model information and uses reliability information on the object from the one viewpoint to generate second object information having a reduced data amount of the model information or the source data.

A third aspect of the present invention provides a detection method, including: detecting an object from one viewpoint; calculating reliability information on the object from the one viewpoint; using detection results of the object from the one viewpoint to calculate model information including at least one of shape information and texture information on the object from the one viewpoint; and using first object information including the model information or source data used for generation of the model information and using the reliability information to generate second object information having a reduced data amount of the model information or the source data.

A fourth aspect of the present invention provides a storage medium storing therein a detection program causing a computer to execute: calculating reliability information on an object at one viewpoint; using detection results of the object from the one viewpoint to calculate model information including at least one of shape information and texture information on the object at the one viewpoint; and using first object information including the model information or source data used for generation of the model information and using the reliability information to generate second object information having a reduced data amount of the model information or the source data.

A fifth aspect of the present invention provides a detection device, including: a detector that detects an object from one direction; an information calculator that calculates, based on detection results of the detector, model information including shape information or texture information on the object from the one direction; and an information processor that uses first object information including the model information or source data used for generation of the model information and uses reliability information on the object in the one direction to generate second object information having a reduced data amount of the model information or the source data.

A sixth aspect of the present invention provides 1 detection device, including: a detector that takes an image of an object from one direction; an information calculator that calculates, based on imaging results of the detector, model information on the object from the one direction; and an information processor that uses first object information including input data used for generation of the model information and uses reliability information on the object in the one direction to generate second object information including the model information having the input data reduced.

A seventh aspect of the present invention provides a detection system including: the detection device in the first aspect, the fifth aspect or the sixth aspect; and an information processing device that processes information output from the detection device.

DETAILED DESCRIPTION OF EMBODIMENTS

First Embodiment

Figure 1A:
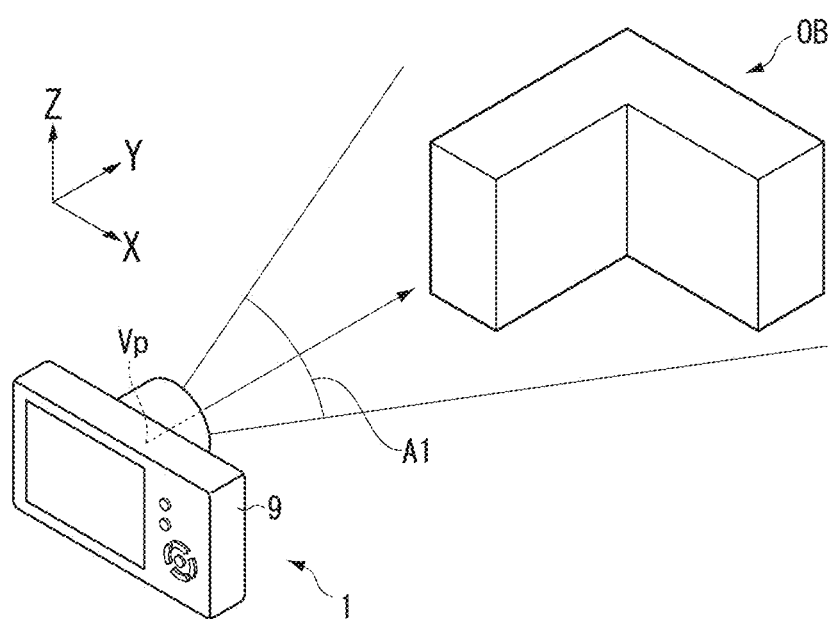
FIGS. 1A and 1B include diagrams illustrating an example of a detection device according to a first embodiment.

A first embodiment is described. FIG. 1A is a conceptual diagram illustrating an example of a detection device 1 according to the first embodiment. For example, the detection device 1 is an imaging device, and detects an object OB in a detection region A1 (for example, field of view). For example, the detection device 1 may be a fixed-point camera, a camera capable of manually or automatically changing the field of view, or a portable information terminal (for example, smartphone, tablet, and mobile phone with camera). The detection device 1 uses the result of detecting the object OB to perform arithmetic processing on information on the object OB. The detection device 1 performs arithmetic processing on its own terminal to model at least a part of the object OB and calculate model information (model data). For example, the detection device 1 performs arithmetic processing to subject at least a part of the object OB to computer graphics processing (CG processing) to calculate model information (for example, CG model data). For example, the model information includes at least one of shape information representing a three-dimensional shape of the object OB and texture information representing design of the surface of the object OB. For example, the model information includes at least one of three-dimensional point coordinates, relevance information on the point coordinates, texture information on surfaces defined by three-dimensional point coordinates and their relevance information, spatial information on images, such as illumination conditions and light source information in the entire image, and polygon data serving as shape information. For example, the texture information includes at least one information on a character, a figure, a pattern, information defining unevenness, a particular image, and color (for example, chromatic color, achromatic color) of the surface of the object OB. For example, the detection device 1 calculates model information representing an object OB viewed from a viewpoint Vp (for example, one viewpoint, single viewpoint, one direction). For example, the detection device 1 calculates model information representing an object OB viewed from one viewpoint at a predetermined angle from the object OB.

Figure 1B:
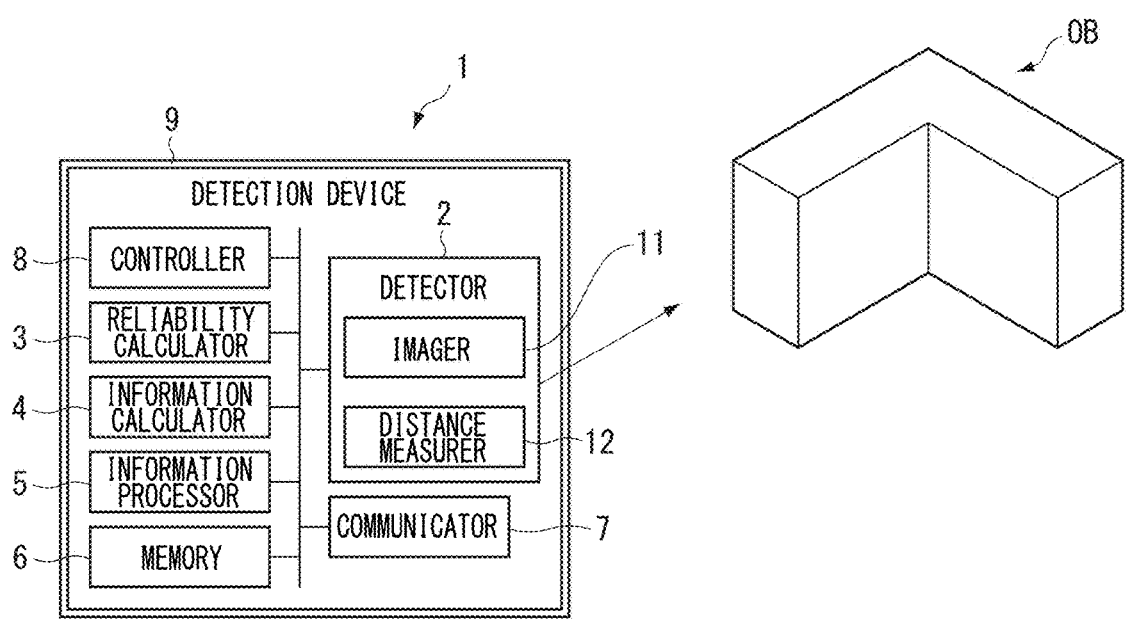

FIG. 1B is a block diagram illustrating an example of the configuration of the detection device 1. For example, the detection device 1 includes a detector 2, an reliability calculator 3, an information calculator 4, an information processor 5, a memory 6, a communicator 7, a controller 8, and a main body 9. Examples of the main body 9 include a camera body, a case, and a casing. For example, the detector 2, the reliability calculator 3, the information calculator 4, and the information processor 5 are provided in the main body 9. For example, the detector 2, the reliability calculator 3, the information calculator 4, and the information processor 5 are provided in the main body 9 to be unitized.

The detector 2 optically detects an object OB from a viewpoint Vp. For example, the detector 2 images the object OB from the viewpoint Vp, and outputs image data on the object OB as detection results. The reliability calculator 3 calculates reliability information on the object OB from the viewpoint Vp. For example, the reliability calculator 3 uses the image data detected by the detector 2 to calculate reliability information on the object OB corresponding to the viewpoint Vp. For example, the reliability information includes at least one of the probability, the probability distribution, and the expected value of the presence of an object at each position in a region including the object OB (for example, detection region A1 or field of view of the detector 2). For example, the probability distribution is information representing the relation between the reliability in a part of the detection region of the detector 2 and the reliability in its peripheral region. For example, the reliability information includes the reliability of detection results of the detector 2 for each position in the region including the object OB (for example, detection region or field of view of the detector 2). For example, the reliability is obtained by converting the certainty (degree of accuracy, precision, reliability) or the inaccuracy (fuzziness, uncertainty) of data on each position into numerals, and the reliability information includes a distribution of reliabilities at a plurality of positions. For example, high reliability corresponds to high certainty or low inaccuracy. For example, low reliability corresponds to low certainty or high inaccuracy.

The information calculator 4 uses the detection results of the detector 2 to calculate model information. The model information includes at least one of shape information and texture information on the object OB from the viewpoint Vp. For example, the information calculator 4 calculates at least one of shape information and texture information on the object OB viewed from the viewpoint Vp. For example, the detector 2 detects distances from the viewpoint Vp to each point on the object OB, and the information calculator 4 uses the distances detected by the detector 2 to calculate point cloud data on the object OB. For example, the information calculator 4 uses the point cloud data to calculate surface information on the object OB.

Figure 2A:
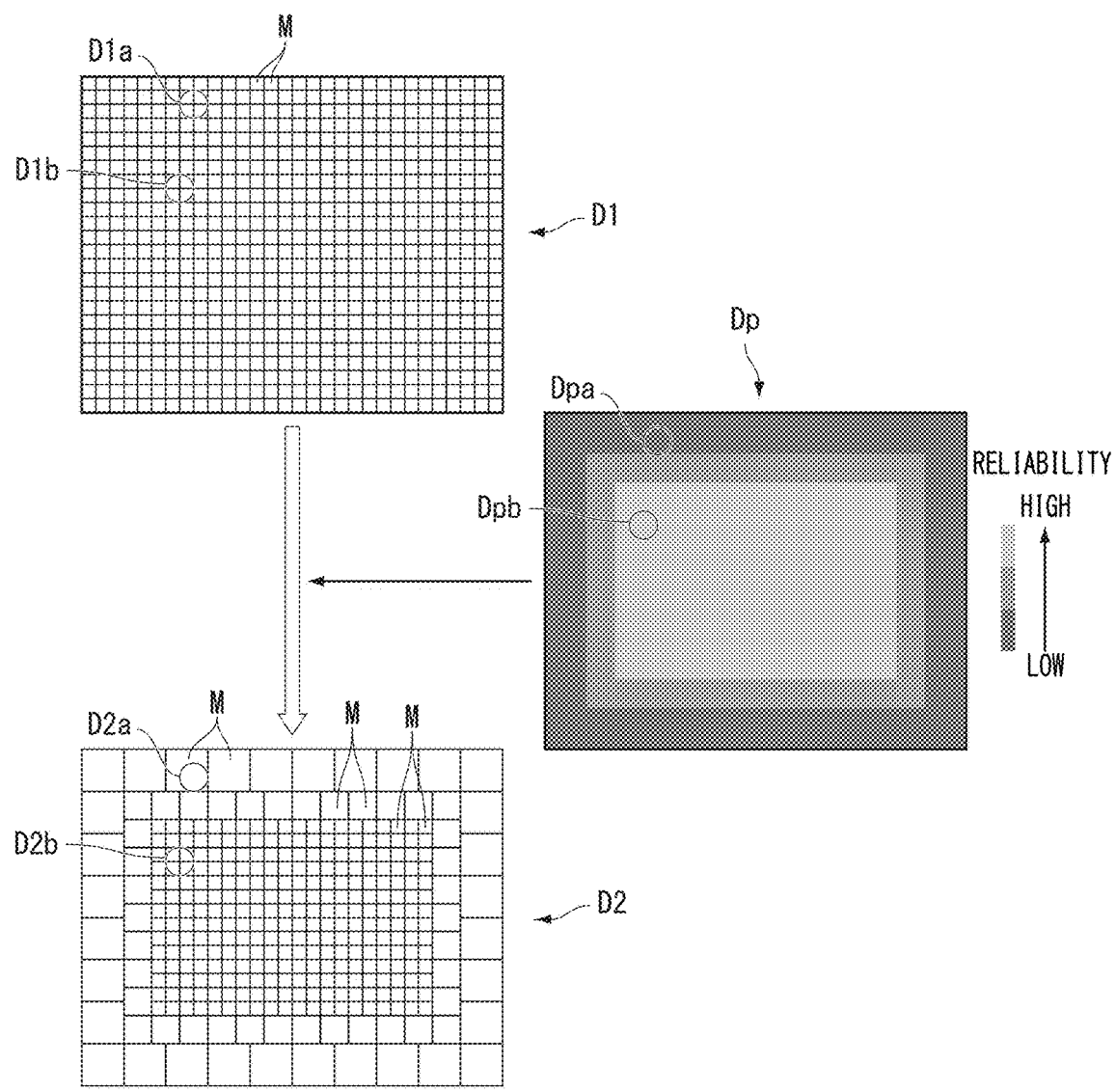
FIGS. 2A and 2B include conceptual diagrams illustrating processing of an information processor according to the first embodiment.
Figure 2B:
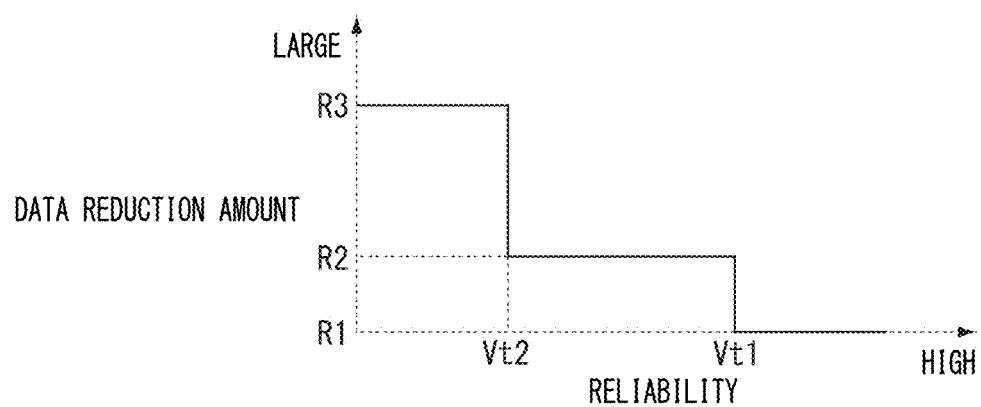

FIGS. 2A and 2B include conceptual diagrams illustrating processing of the information processor 5. The information processor 5 uses first object information D1 and reliability information Dp to generate second object information D2. In FIG. 2A, the first object information D1, the second object information D2, and the reliability information Dp are conceptually illustrated. In FIG. 2A, symbol M is a data point (for example, point data), and each data point M is fixed-length data having a fixed data amount. For example, the reliability information Dp includes reliabilities (for example, Dpa, Dpb) of first object information D1 (for example, D1a, D1b) that differ for each part of the object OB, and, for example, the information processor 5 generates second object information D2 by using the reliability information Dp including reliabilities that differ for each part of the object OB. For example, the object OB includes a first part and a second part whose positions are different from each other, and in FIG. 2A, information on the first part in the first object information D1 is represented by symbol D1a, and information on the second part in the first object information D1 is represented by symbol D1b. Information on the second part in the second object information D2 is represented by symbol D2a, and information on the second part in the second object information D2 is represented by symbol D2b.

The second part may be a part that partially overlaps with the first part, a part adjacent to the first part, or a part that does not overlap with the first part when viewed from the viewpoint Vp. At least one of the first part and the second part may be a part (feature part) including feature points of the object OB, a part to be analyzed (for example, shape analysis) of the object OB, or a part from which model information is calculated of the object OB.

The first object information D1 (data input to the information processor 5) includes model information or source data used for generation of the model information (information for generating model information). For example, the first object information D1 is selected from detection data obtained by detecting the object OB, depth information representing distances from the viewpoint Vp to each point on the object OB, point cloud data on the object OB, surface information on the object OB, and texture information on the object OB. For example, the above-mentioned detection data includes data obtained by receiving light from the object OB, and may include taken image data obtained by imaging the object OB. The second object information D2 (data output from the information processor 5) is information obtained by reducing the data amount of model information or source data included in the first object information D1. For example, the first object information D1 is point cloud data on the object OB, and the second object information D2 is point cloud data whose data amount is reduced from the first object information D1. For example, the information processor 5 generates second object data D2 obtained by compressing first object information D1. For example, the information processor 5 updates (converts) the first object information D1 with (into) the second object data D2.

For example, the information processor 5 uses the acquired reliability information Dp to delete (or mask) data points (for example, point data) whose reliabilities are relatively low or lower than a threshold (reference value) at the viewpoint Vp, and reduces data points (for example, decimation) from the first object information D1 to reduce the data amount, thereby generating second object information D2. For example, the information processor 5 may reduce the data amount of at least a part of data points. For example, the information processor 5 may reduce the data amount in a manner that data represented by bits (for example, a double precision floating point number) in the first object information D1 is represented by 32 bits (for example, a single precision floating point number). The information processor 5 may generate second object information D2 by lossy compression (irreversible compression) of the first object information D1.

For example, the reliability information Dp includes the reliability of the first object information D1 for each part (for example, point, line, or surface) of the object OB. For example, the reliability information Dp includes the reliability of the first object information D1 for each data point M in the object OB, which corresponds to each point on the object OB. In FIG. 2A, in the reliability information Dp, the reliability for a first part is represented by symbol Dpa, and the reliability for a second part is represented by symbol Dpb. For example, the information processor 5 generates the second object information D2 by comparing the reliabilities in the first object information D1. For example, the information processor 5 compares the reliability of the first object information D1 (information D1a) on the first part and the reliability Dpb of the first object information (information D1b) on the second part to each other to determine a reduction amount of the data amount for the first part or the second part. For example, when the reliability Dpa for the first part is lower than the reliability Dpb for the second part, the information processor 5 sets the data amount of the information Dpb on the first part to be relatively or absolutely smaller than the data amount of the information Dpa on the second part. For example, in the first object information D1, the information Dpa on the first part and the information Dpb on the second part each include four data points M, and the information processor 5 represents the information D2a on the first part by one data point in the second object information D2, thereby reducing the data amount. As illustrated in FIG. 2A, for example, the reliability information Dp is reference data in which reliabilities of data points M are arranged correspondingly to the data points M. The information processor 5 matches the above-mentioned reference data with each data point M correspondingly to each data point M in the first object information D1, and reduces the data amount for each data point M in accordance with each reliability in the reference data.

The information processor 5 may determine the data reduction amount for the first part by comparing the reliability Dpa of the first object information D1 (information D1a) on the first part of the object OB with a threshold. FIG. 2B illustrates an example of the relation between the reliability and the reduction amount of the data amount. When the reliability Dpa for the first part is equal to or higher than a threshold Vt1, the information processor 5 determines the reduction amount of the data amount (for example, compression ratio) to a value R1. The value R1 may be 0% (for example, non-compression) in terms of the ratio of information D1a to the data amount, or may be a desired value larger than 0%. When the reliability Dpa for the first part is lower than the threshold Vt1 and equal to or higher than a threshold Vt2, the information processor 5 determines the reduction amount of the data amount to a value R2. The value R2 is a value larger than the value R1 (for example, high compression ratio). When the reliability Dpa for the first part is lower than the threshold Vt2, the information processor 5 determines the reduction amount of the data amount to a value R3. The value R3 is a value larger than the value R2 (for example, high compression ratio). The value R3 may be a value corresponding to data deletion, or may be a desired value smaller than 100% in terms of the ratio of the information D1a to the data amount.

In FIG. 2B, an example where the two thresholds Vt1 and Vt2 are used is illustrated, but the number of the thresholds may be one or any number of three or more. The threshold may be a predetermined fixed value, or may be a variable value corresponding to the reliability of the first object information D1. For example, the threshold may be calculated (determined) based on a distribution of reliabilities. For example, the threshold may be determined by using statistics (for example, average value, mode value, standard deviation) of the reliability in the reliability information Dp on the first object information D1.

Figure 3:
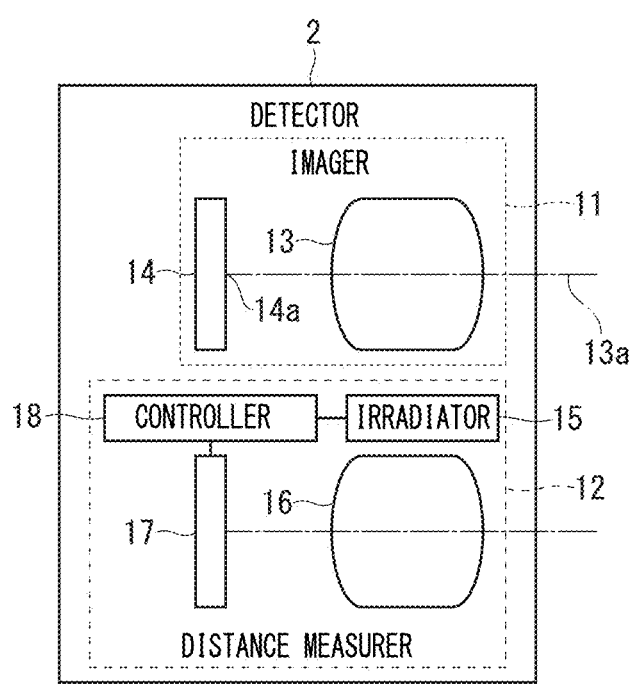
FIG. 3 is a diagram illustrating an example of a detector according to the first embodiment.

Next, the units in the detection device 1 are described. FIG. 3 is a diagram illustrating an example of the detector 2. For example, the detector 2 acquires at least one of an image of the object OB viewed from a one viewpoint and a distance from the one viewpoint to each point on the object OB. For example, the detector 2 may detect the object OB from a predetermined angle of sight. For example, the detector 2 may detect the object OB from a predetermined line of sight (for example, single line of sight). For example, the detector 2 includes an imager 11 and a distance measurer 12. The imager 11 images the object OB. The distance measurer 12 detects the distance from the viewpoint Vp (see FIG. 1A) to each point on the object OB. The detector 2 is not necessarily required to include the imager 11 and the distance measurer 12.

The imager 11 includes an image forming optical system 13 and an imaging element 14. The image forming optical system 13 forms an image of the object OB. For example, the image forming optical system 13 is held in a lens barrel and mounted to the main body 9 (see FIGS. 1A and 1B) together with the lens barrel. Examples of the image forming optical system 13 and the lens barrel include an interchangeable lens, which is detachable from the main body 9. The image forming optical system 13 and the lens barrel may be a built-in lens, and, for example, the lens barrel may be a part of the main body 9 and may be undetachable from the main body 9.

For example, the imaging element 14 is a CMOS image sensor or a CCD image sensor in which a plurality of pixels are two-dimensionally arranged. For example, the imaging element 14 is housed in the main body 9. The imaging element 14 takes an image formed by the image forming optical system 13. For example, imaging results (detection results) of the imaging element 14 include information (for example, RGB data) on gray-scale values of each color of each pixel. For example, the imaging element 14 outputs the imaging results in a data format of a full-color image.

The distance measurer 12 detects a distance from each point on the surface of the object OB. For example, the distance measurer 12 detects the distance by a time of flight (TOF) method. The distance measurer 12 may detect the distance by another method. For example, the distance measurer 12 may include a laser scanner and detect the distance by laser scanning. For example, the distance measurer 12 may project a predetermined pattern to the object OB and measure the distance based on a result of detecting the pattern. The distance measurer 12 may include a phase difference sensor and detect the distance by the phase difference method. The distance measurer 12 may detect the distance by a depth from defocus (DFD) method. In the case where the DFD method is used, the distance measurer 12 may use at least one of the image forming optical system 13 and the imaging element 14 in the imager 11.

For example, the distance measurer 12 includes an irradiator 15, an image forming optical system 16, an imaging element 17, and a controller 18. The irradiator 15 is able to irradiate the object OB with infrared light. The irradiator 15 is controlled by the controller 18. The controller 18 temporally changes (for example, amplitude modulates) the intensity of infrared light applied from the irradiator 15. The image forming optical system 16 forms an image of the object OB. The image forming optical system 16, similarly to the image forming optical system 13, may be at least a part of interchangeable lenses or at least a part of built-in lenses. The imaging element 17 is, for example, a CMOS image sensor or a CCD image sensor. The imaging element 17 has sensitivity to at least a wavelength band of light applied by the irradiator 15. The imaging element 17 is, for example, controlled by the controller 18 to detect infrared light reflected and scattered by the object OB. For example, the imaging element 17 takes the image formed by the image forming optical system 16.

The controller 18 uses the detection results of the imaging element 17 to detect distances (depths) from points on the surface of the object OB to the imaging element 17. For example, flying time of light entering the imaging element 17 from a point on the surface of the object OB changes depending on the depth of the point. The output of the imaging element 17 changes depending on the flying time, and, for example, the controller 18 calculates the depth based on the output of the imaging element 17. For example, the controller 18 calculates the depth for each partial region (for example, one pixel, pixels) of an image taken by the imaging element 17, and calculates (generates) depth information by associating the position and the depth in the region. For example, the depth information includes information in which the position of a point on the surface of the object OB and the distance (depth) from the point to the detection device 1 are associated with each other. For example, the depth information includes information (for example, a depth image) representing a distribution of depths (for example, depth map) in the object OB. For example, the depth image is a gray-scale image in which the distances from positions on the object OB corresponding to pixels to the predetermined viewpoint Vp are represented by gradation.

Figure 4:
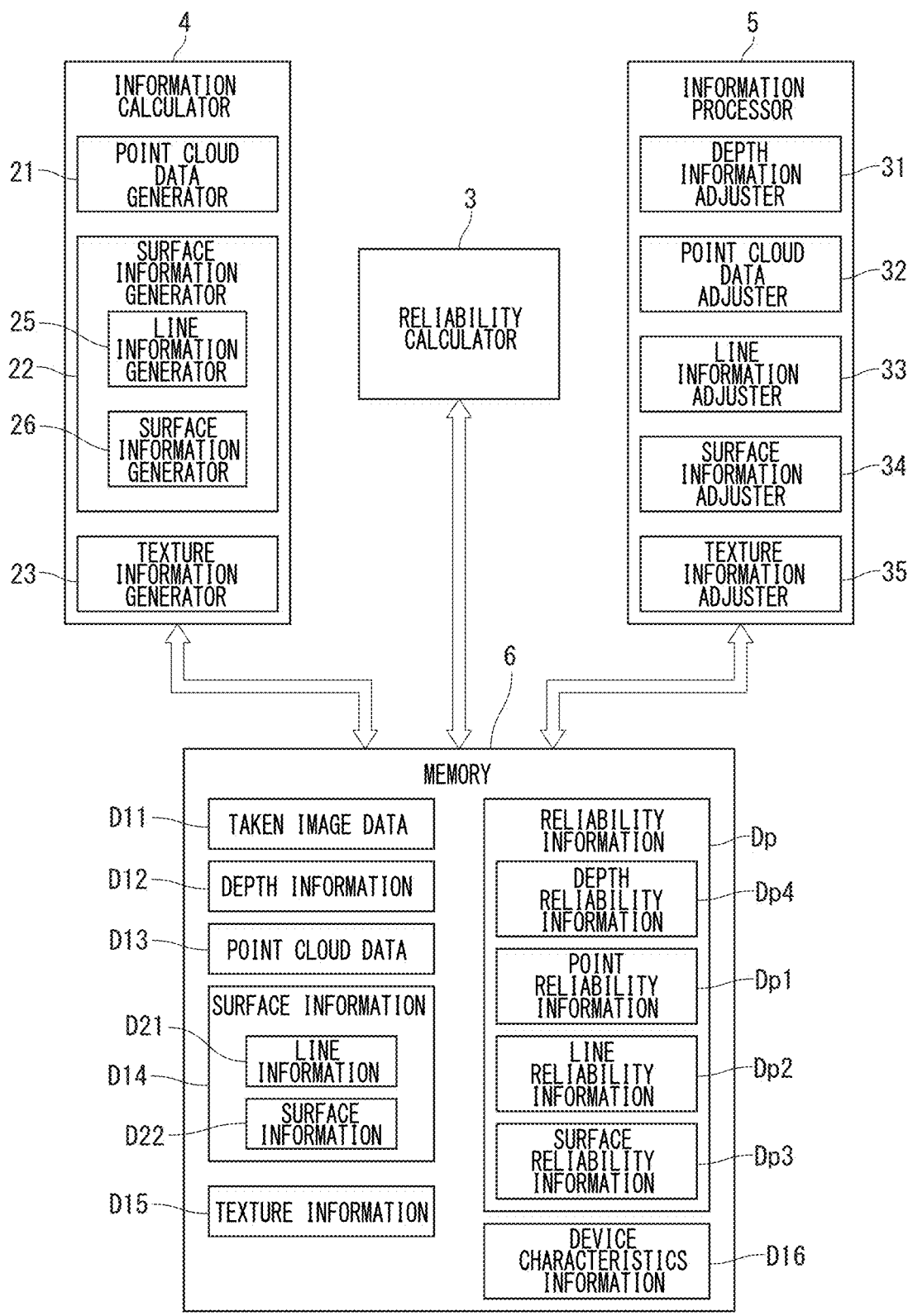
FIG. 4 is a block diagram illustrating an information calculator, an reliability calculator, an information processor, and a memory according to the first embodiment.

FIG. 4 is a block diagram illustrating the information calculator 4, the reliability calculator 3, the information processor 5, and the memory 6 according to the embodiment. For example, the memory 6 includes a non-volatile memory. For example, the memory 6 stores therein detection results of the detector 2 (for example, the taken image data D11, the depth information D12), calculation results of the information calculator 4 (the point cloud data D13, the surface information D14, the texture information D15), calculation results of the reliability calculator 3 (the reliability information Dp), information generated (updated, adjusted) by the information processor 5, device characteristics information D16, setting information, and programs for executing processing.

For example, the information calculator 4 includes a digital signal processor (DSP). Although the distance measurer 12 generates depth information in the description with reference to FIG. 3, the information calculator 4 may generate depth information based on the depth detected by the distance measurer 12. The information calculator 4 includes a point cloud data generator 21, a surface information generator 22, and a texture information generator 23. For example, the point cloud data generator 21 calculates, as shape information, point cloud data D13 including coordinates of a plurality of points on the object OB based on the detection results of the detector 2. The information calculator 4 uses the detection results of the distance measurer 12 (for example, depth information) to calculate the point cloud data D13 (point cloud data processing). For example, the point cloud data generator calculates the point cloud data by perspective transformation from a distance image (depth image) represented by the depth information to a planar image. When the imager 11 and the distance measurer 12 have different fields of view, for example, the point cloud data generator 21 may convert the detection results of the distance measurer 12 into the result of detecting the object OB from the field of view of the imager 11 by perspective transformation (projection transformation). For example, the point cloud data generator 21 may execute perspective transformation by using parameters that depend on the position relation between the field of view of the imager 11 and the field of view of the distance measurer 12 (for example, position of viewpoint, direction of line of sight). The information calculator 4 stores the calculated point cloud data D13 in the memory 6.

The surface information generator 22 generates, as shape information, surface information including coordinates of a plurality of points on the object OB and connection information among the points based on the detection results of the detector 2. Examples of the surface information include polygon data, vector data, and draw data. For example, the connection information includes information (line information D21) on a line connecting two points on the object OB and information (the surface information D22) on a surface surrounded by three or more lines on the object OB. Examples of the line information D21 include information that associates points of both ends of a line corresponding to a ridge (for example, edge) of the object OB. The surface information D22 is information that associates a plurality of lines corresponding to the contour of a surface of the object OB with one another.

The surface information generator 22 includes a line information generator 25 and a surface information generator 26. For example, the line information generator 25 uses point cloud data D13 to generate line information D21. For example, the surface information generator 26 uses the line information D21 to generate the surface information D22. For example, the information calculator 4 estimates a surface between a point selected from among a plurality of points included in the point cloud data D13 and a neighborhood point, and converts point cloud data into polygon data having planar information among the points (surface processing). For example, the information calculator 4 converts the point cloud data into the polygon data by an algorithm using the least squares method. For example, an algorithm published in a point cloud processing library may be applied to this algorithm. The information calculator 4 stores the calculated surface information in the memory 6.

The texture information generator 23 calculates the texture information D15 by, for example, inverse rendering. The texture information D15 includes, for example, information on at least one item of pattern information representing a pattern of the surface of the object OB, light source information on light applied to the object OB, and optical characteristics information representing optical characteristics (for example, reflectivity, scattering rate, and transmittance) of the surface of the object OB. The light source information includes, for example, information on at least one item of the position of a light source, the direction of light applied from the light source to the object, the wavelength of light applied from the light source, or the type of light source.

For example, the texture information generator 23 calculates the light source information by using a model that assumes Lambertian reflectance or a model including Albedo estimation. For example, the information calculator 4 estimates, among pixel values of respective pixels in an image taken by the imager 11, a component derived from light diffused by the object OB and a component regularly reflected by the object OB. For example, the texture information generator 23 uses the result of estimating the component regularly reflected by the object OB and shape information to calculate the direction in which light enters the object OB from the light source. For example, the texture information generator 23 uses the calculated light source information and shape information to estimate reflection characteristics of the object OB, and calculates optical characteristics information including the estimation result of the reflection characteristics. For example, the information calculator 4 uses the calculated light source information and optical characteristics information to remove the influence of illumination light from visible light image data, and calculates the texture information D15 (pattern information). The information calculator 4 stores the calculated texture information D15 in the memory 6.

The reliability calculator 3 calculates reliability information based on the device characteristics information D16, for example. The device characteristics information D16 is information representing characteristics of the units provided in the detection device 1. For example, the device characteristics information D16 includes optical characteristics (for example, aberration) of optical systems (for example, the image forming optical system 13, the image forming optical system 16) provided in the detector 2 and characteristics of the distance measurement range of the distance measurer 12.

Figure 5A:
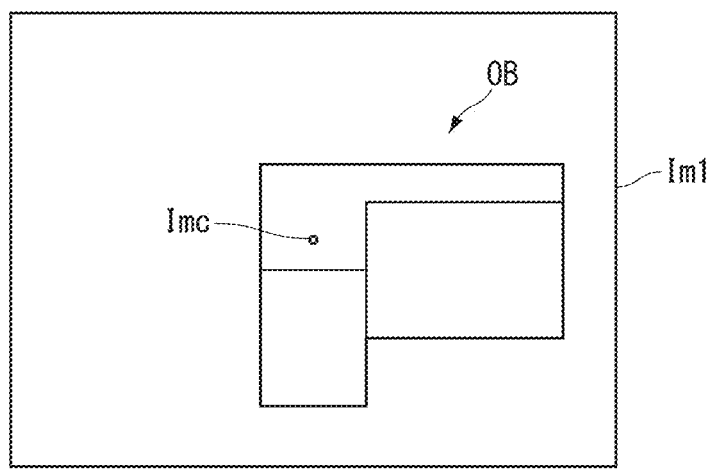
FIGS. 5A to 5C include explanatory diagrams of reliability information based on optical characteristics of the detector according to the first embodiment.
Figure 5B:
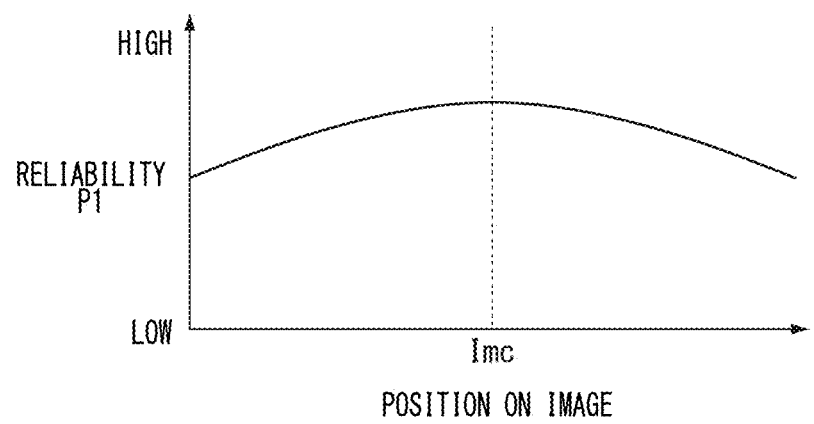
Figure 5C:
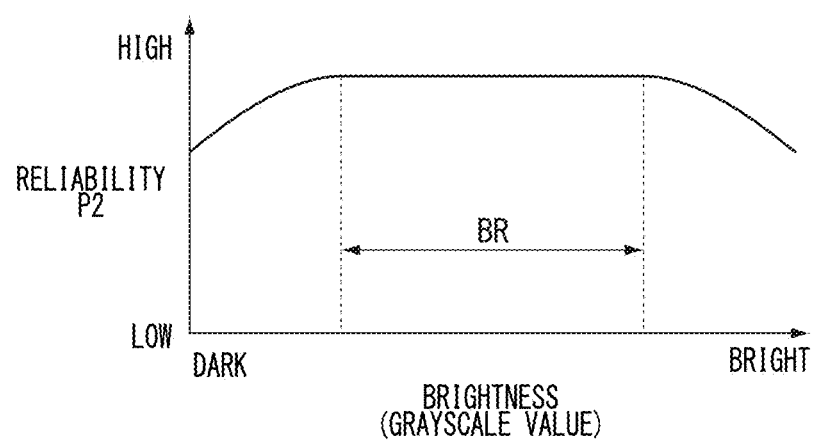

FIGS. 5A to 5C include explanatory diagrams of the reliability information based on the device characteristics information D16. FIG. 5A is a conceptual diagram illustrating an example of an image Im1 taken by the imager 11. For example, aberration of the image forming optical system 13 (see FIG. 3) becomes larger as the image forming optical system 13 is away from an optical axis 13a. For example, the optical axis 13a of the image forming optical system 13 corresponds to a visual field center 14a of the imager 11, and in the imager 11, a region (for example, one pixel, a plurality of pixels) in the imaging element 14 that is farther from the visual field center 14a has a lower reliability of detection results using this region. In FIG. 5A, symbol Imc indicates a position on the taken image Im1 corresponding to the visual field center of the imager 11. In the taken image Im1, for example, the influence of aberration becomes larger as being away from the position Imc, and the reproducibility (reliability of detection results) of a subject becomes lower due to blur. For example, the reliability calculator 3 calculates reliability information based on the distance from the position Imc for each region (for example, one pixel, a plurality of pixels) in the taken image Im1.

FIG. 5B is a conceptual diagram illustrating an example of the reliability corresponding to the distance from the visual field center (position Imc) of the imager 11 on the taken image Im1. In FIG. 5B, the vertical axis represents an reliability P1, and the horizontal axis represents the position on the taken image Im1. For example, the reliability P1 becomes maximum at the position Imc, and decreases as being away from the position Imc. For example, the relation between the reliability P1 and the distance from the visual field center of the imager 11 is determined based on a distribution of aberration caused by the image forming optical system 13 on the imaging element 14. The reliability P1 changes non-linearly with respect to the distance from the position Imc, but may change linearly with respect to the distance from the position Imc or may change discontinuously (for example, stepwise).

Information (hereinafter referred to as "first relation information") representing the relation between the reliability P1 and a distance from the visual field center of the imager 11 on the taken image Im1 is, for example, included in the above-mentioned device characteristics information D16 and stored in the memory 6 (see FIG. 4) in advance. For example, the reliability calculator 3 calculates the distance from the position Imc for each region (for example, one pixel, a plurality of pixels) of the taken image Im1. The reliability calculator 3 collates the calculated distance with the first relation information, and calculates the reliability P1 in this region. For example, the reliability calculator 3 calculates, as the reliability information, information (hereinafter referred to as "information on the reliability P1") in which the position of each region and the reliability P1 are associated with each other.

The reliability calculator 3 may calculate reliability information based on aberration (for example, a distribution of aberration) of the image forming optical system 13. The reliability calculator 3 may calculate reliability information based on the aberration of the image forming optical system 13 and the distance from the visual field center. The reliability calculator 3 may calculate reliability information for the detection results of the distance measurer 12 based on at least one of the distance from the visual field center of the distance measurer 12 and the aberration of the image forming optical system 16.

In the taken image Im1, for example, brightness in a partial region may saturate due to light reflected from the object OB. For example, when there is a shade of another object on the object OB, there may be a dark part as viewed from the viewpoint Vp. For example, the reliability calculator 3 may calculate reliability information based on brightness (the degree of brightness) in the taken image Im1. FIG. 5C is a conceptual diagram illustrating an example of an reliability P2 corresponding to the brightness in the taken image Im1. In FIG. 5C, the vertical axis represents the reliability P2, and the horizontal axis represents the brightness (for example, grayscale values of pixels). The reliability P2 is constant when the brightness is within a predetermined range BR. The reliability P2 becomes lower as the brightness becomes lower (darker) than the range BR, and the reliability P2 becomes lower as the brightness becomes higher (brighter) than the range BR. For example, the relation between the brightness and the reliability is freely set based on experiments or simulations. For example, the reliability P2 may change non-linearly, linear, or discontinuously (for example, stepwise) with respect to the brightness.

Information (hereinafter referred to as "second relation information") representing the relation between brightness and reliability is, for example, stored in the memory 6 (see FIG. 4) in advance. The reliability calculator 3 collates the brightness (for example, grayscale value) of each region (for example, one pixel, a plurality of pixels) of the taken image with the above-mentioned second relation information, and calculates the reliability P2 in this region. For example, the reliability calculator 3 calculates, as the reliability information, information (hereinafter referred to as "information on the reliability P2") in which the position of each region and the reliability P2 are associated with each other.

At least one of the information on the reliability P1 and the information on the reliability P2 described above may be stored in the same file as data on taken images. For example, this information may have a data structure (data format) in which grayscale values of pixels (grayscale values of R, G, and B) and the reliability (for example, at least one of the reliability P1 and the reliability P2) are paired. At least one of the information on the reliability P1 and the information on the reliability P2 may be stored in a file different from data on taken images. For example, the information on the reliability P1 may have a data structure in which values of reliabilities of pixels are arranged correspondingly to the pixel arrangement in the taken image. The reliability calculator 3 is not necessarily required to calculate reliability information based on optical characteristics of optical systems (for example, the image forming optical system 13, the image forming optical system 16) provided in the detector 2.

For example, the reliability calculator 3 is not necessarily required to calculate at least one of the reliability P1 and the reliability P2 described above.

Figure 6A:
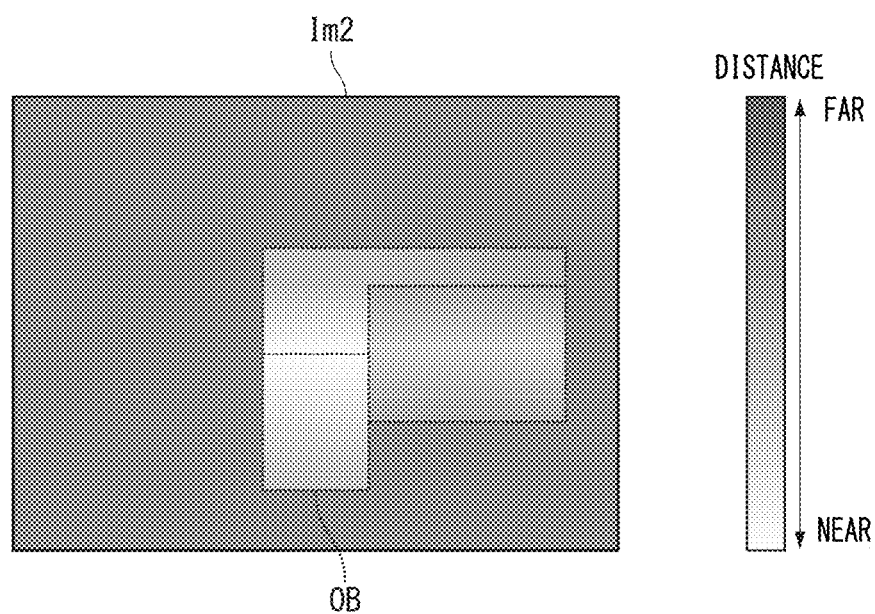
FIGS. 6A to 6C include explanatory diagrams of reliability information based on the distance according to the first embodiment.
Figure 6B:
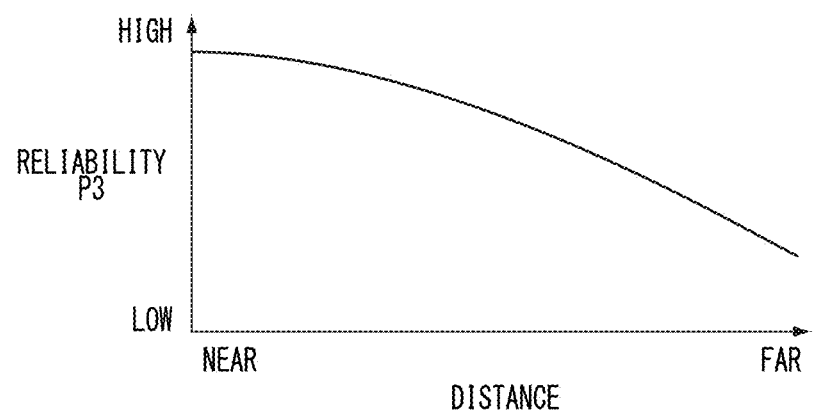
Figure 6C:
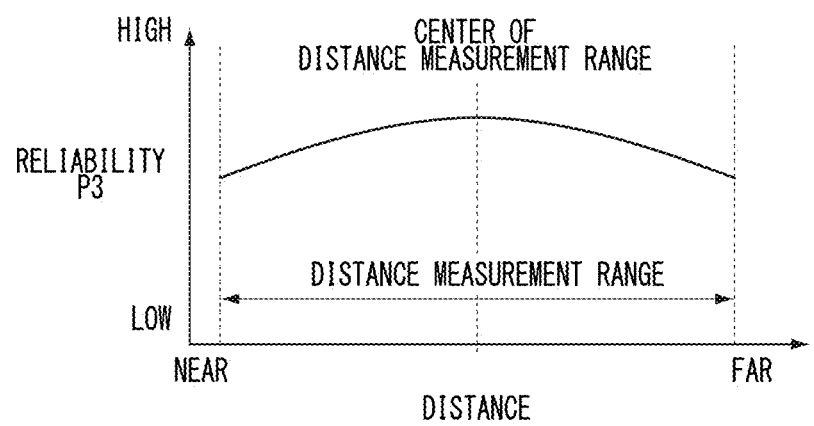

For example, the reliability calculator 3 calculates reliability information Dp based on the distance detected by the distance measurer 12. FIGS. 6A to 6C includes explanatory diagrams of reliability information based on the distance detected by the distance measurer 12. FIG. 6A is a conceptual diagram illustrating an example of depth information (depth image Im2). In FIG. 6A, the object OB is represented by dotted lines, and the distance for each region (for example, one pixel or a plurality of pixels in the depth image Im2) included in the detection region A1 of the detector 2 is represented by grayscales. In the depth image Im2, a part having a high grayscale value (close to white) has a small distance from the viewpoint Vp, and a part having a low grayscale value (close to black) has a large distance from the viewpoint Vp.

FIG. 6B is a diagram illustrating an example of the relation between the distance and the reliability P3. For example, the distance measurer 12 may have a lower reliability (for example, detection precision) of detection results at a position farther from the viewpoint Vp. In such a case, for example, the reliability calculator 3 calculates, as the reliability information, an reliability P3 having a value that has a negative correlation with the distance. In FIG. 6B, the reliability P3 decreases as the distance from the viewpoint Vp increases. Information (hereinafter referred to as "third relation information") representing the relation between the reliability P3 and the distance from the viewpoint Vp is, for example, stored in the memory 6 (see FIG. 4) in advance. For example, the reliability calculator 3 collates, for each region (for example, one pixel, a plurality of pixels) on the depth image Im2 (see FIG. 5A), the distance from the viewpoint Vp in the region with the third relation information to calculate the reliability P3 in this region. For example, the reliability calculator 3 calculates, as the reliability information, information (hereinafter referred to as "information on the reliability P3") in which the position of each region and the reliability P3 are associated with each other.

FIG. 5C is a diagram illustrating another example of the relation between the distance and the reliability P3. For example, the distance measurer 12 has a predetermined distance measurement range, and may have a lower reliability (for example, detection precision) of detection results as being farther from the center of the distance measurement range. In such a case, for example, the reliability calculator 3 may calculate, as the reliability information, reliability information based on a deviation amount between the center of the distance measurement range and the distance from a predetermined viewpoint. In FIG. 5C, the reliability P3 becomes maximum at the center of the distance measurement range, and decreases as the distance deviates from the center of the distance measurement range. As illustrated in FIG. 5B and FIG. 5C, for example, the relation between the distance and the reliability P3 is set as appropriate in accordance with the characteristics of the distance measurer 12.

Figure 7A:
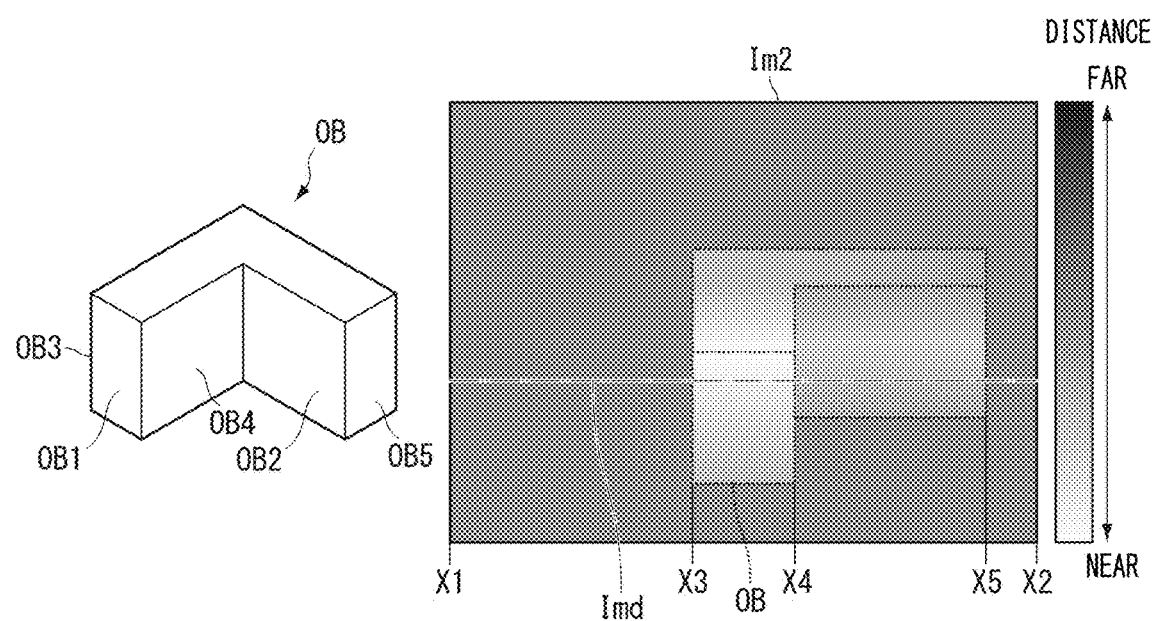
FIGS. 7A to 7D include explanatory diagrams of the reliability information based on the distribution of the distance according to the first embodiment.

The reliability calculator 3 may calculate reliability information based on a distribution of the distance detected by the distance measurer 12. FIGS. 7A to 7D include explanatory diagrams of the reliability information based on the distribution of the distance. FIG. 7A is a conceptual diagram illustrating an example of depth information (depth image Im2) and an object OB. In FIG. 7A, symbols X1 to X5 represent positions on the depth image Im2 in one direction.

The position X1 is the position at one end of the depth image Im2, and the position X2 is the position at the other end of the depth image Im2. A section from the position X1 to the position X3 corresponds to the background (for example, floor, wall) of the object OB. A section from the position X3 to the position X4 corresponds to a front surface OB1 of the object OB. A section from the position X4 to the position X5 corresponds to a surface OB2 having a step with the front surface OB1. A section between the position X5 and the position X2 corresponds to the background of the object OB. The position X3 corresponds to a side surface OB3 with respect to the front surface OB1, and the position X4 corresponds to a side surface OB4 between the front surface OB1 and the surface OB2. The position X5 corresponds to a side surface OB5 with respect to the surface OB2. For example, the side surface OB3, the side surface OB4, and the side surface OB5 are surfaces that are close to being parallel to the line of sight from the viewpoint Vp, and the reliability of the detection results thereof may be low.

Figure 7B:
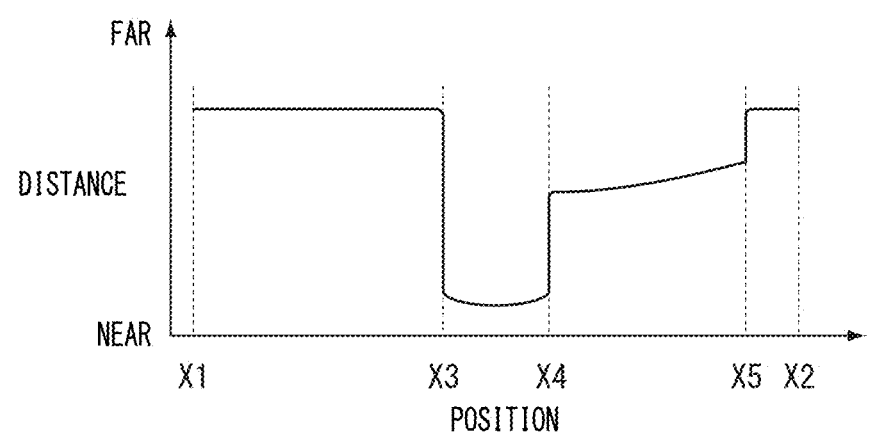

FIG. 7B is a conceptual diagram illustrating a distribution of distances on a line Imd in FIG. 7A. In FIG. 7B, the distance from the viewpoint Vp changes stepwise at the position X3, the position X4, and the position X5. For example, the reliability of the detection results of the distance measurer 12 decreases at positions (for example, near steps) at which the change amount of the distance is larger than a threshold. In such cases, for example, the reliability calculator 3 may calculate an reliability corresponding to the change amount of the distance as reliability information. For example, the reliability calculator 3 may calculate, as the reliability information, an reliability having a value that has a negative correlation with the change amount of the distance. For example, the reliability calculator 3 may calculate an reliability indicating that the reliability of the detection result of the distance measurer 12 is high in a region where the change amount of the distance is relatively small. For example, the reliability calculator may calculate an reliability indicating that the reliability of the detection result of the distance measurer 12 is low in a region where the change amount of the distance is relatively large.

Figure 7C:
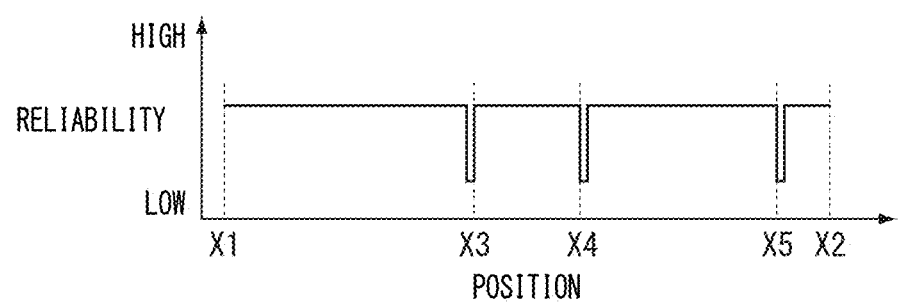

FIG. 7C is a conceptual diagram illustrating an example of a distribution of reliabilities P4 based on the change amount of the distance. In FIG. 7C, the distribution of the reliabilities P4 corresponding to the distribution of distances in FIG. 7B is conceptually illustrated. For example, the change amount of the distance is an amount corresponding to an inclination between the line of sight passing through the viewpoint of the detector 2 and the surface on the object OB. For example, when the change amount of the distance is large, the surface on the object OB is close to being parallel to the line of sight, and when the change amount of the distance is small, the surface on the object OB is close to being perpendicular to the line of sight. In FIG. 7C, the reliability P4 is relatively low at positions (for example, the positions X3, X4, and X5) at which the change amount of the distance is large. For example, the reliability calculator 3 calculates the change amount of the distance for each region in the depth image Im2 (for example, difference in depth in two adjacent regions), and compares the calculated change amount with a threshold. For example, when the change amount of the distance is equal to or smaller than the threshold, the reliability calculator 3 sets the reliability P4 in this region to High level. When the change amount of the distance is larger than the threshold, the reliability calculator 3 sets the reliability P4 in this region to Low level.

Figure 7D:
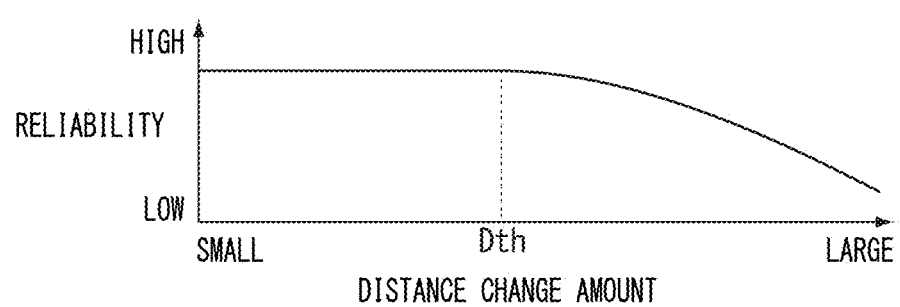

FIG. 7D is a conceptual diagram illustrating an example of the relation between the change amount of the distance and the reliability P4. In FIG. 7D, the reliability P4 is constant when the change amount of the distance is within a range equal to or lower than a threshold Dth, and decreases when the change amount of the distance is in a range exceeding the threshold Dth. The reliability P4 may change non-linearly, linearly, or discontinuously (for example, stepwise) with respect to the change amount of the distance. Information (hereinafter referred to as "fourth relation information") representing the relation between the reliability P4 and the change amount of the distance from the viewpoint Vp is, for example, stored in the memory 6 (see FIG. 1B) in advance. For example, the reliability calculator 3 calculates a change amount of the distance from the viewpoint Vp for each region (for example, one pixel, a plurality of pixels) on the depth image Im2 (see FIG. 7A), and collates the change amount with the fourth relation information to calculate the reliability P4 of each region. For example, the reliability calculator 3 calculates, as the reliability information, information (hereinafter referred to as "information on the reliability P4") in which the position of each region and the reliability P4 are associated with each other.

At least one of the information on the reliability P3 and the information on the reliability P4 described above may be stored in the same file as the depth information. For example, this information may have a data structure (data format) in which the reliability (at least one of the reliability P3 and the reliability P4) and the depth are paired for each partial region of the detection region A1. For example, the information may be represented in a format in which the value of the depth and the reliability are paired for each region (for example, one pixel, a plurality of pixels) in the depth image Im2. At least one of the information on the reliability P3 and the information on the reliability P4 may be stored in a file different from the depth information. For example, at least one of the data structure of the information on the reliability P1 and the data structure of the information on the reliability P2 may be a structure in which the values of reliabilities in regions in the depth information are arranged correspondingly to the data arrangement of the distances in the regions.

The reliability calculator 3 is not necessarily required to calculate at least one of the information on the reliability P3 and the information on the reliability P4. The reliability calculator 3 is not necessarily required to calculate reliability information based on the distance detected by the detector 2 (for example, the distance measurer 12). The reliability calculator 3 may calculate an reliability obtained by combining two or more of the above-mentioned reliabilities P1 to P4. For example, the reliability calculator 3 may calculate the reliability by performing weighting (calculation of weighted average) using two or more of the above-mentioned reliabilities P1 to P4. The reliability calculator 3 may calculate at least one of arithmetic mean and geometric mean of two or more of the reliabilities P1 to P4 as the reliability.

The information calculator 4 may use the reliability information Dp to calculate the point cloud data D13. For example, the information calculator 4 may select a region where the reliability is relatively high in the depth image, and perform perspective transformation from the depth image into a planar image. For example, the information calculator 4 may omit perspective transformation of at least a part of a region where the reliability is relatively low in the depth image. For example, the information calculator 4 may use a region where the reliability is relatively high in the depth image to interpolate a region where the reliability is relatively low, and perform perspective transformation from the depth image into a planar image. For example, the information calculator 4 may generate information in which the point cloud data D13 and the reliability information Dp are associated with each other. For example, the information calculator 4 may calculate information in which three-dimensional point coordinates included in the point cloud data D13 and the reliability (point reliability information Dp1) of points on the depth image corresponding to the three-dimensional points are associated with each other. For example, this information may have a data structure in which the three-dimensional point coordinates and the reliability are paired. For example, the information calculator 4 may store information in which the point cloud data D13 and the point reliability information Dp1 are associated with each other in the memory 6.

Referring to the description with reference to FIG. 4, for example, the reliability calculator 3 uses the point cloud data D13 generated by the information calculator 4 to calculate reliability information (point reliability information Dp1) on information on points included in the point cloud data D13. For example, the reliability calculator 3 may calculate the point reliability information Dp1 based on distance information between two points included in the point cloud data D13. For example, the reliability calculator 3 may calculate the point reliability information Dp1 by selecting two adjacent points from the point cloud data D13 and comparing the distance between the two points with a threshold. The reliability calculator 3 may calculate point reliability information Dp1 based on spatial frequency information (for example, density of spatial distribution of points) on a plurality of points included in the point cloud data D13. The reliability calculator 3 may calculate the point reliability information Dp1 based on vector information connecting two points included in the point cloud data D13. For example, the reliability calculator 3 may calculate the point reliability information Dp1 by selecting two adjacent points from the point cloud data D13 and using a vector connecting the two points and position information on the detection device 1. For example, the position information on the detection device 1 includes the orientation (detection direction, line of sight, direction of the optical axis of the optical system) of the viewpoint Vp. For example, the reliability calculator 3 may calculate the point reliability information Dp1 in accordance with an angle between a vector connecting two points included in the point cloud data D13 and the orientation of the viewpoint Vp. For example, when an angle between the above-mentioned vector and the orientation of the viewpoint Vp is close to 0° or 180°, the reliability calculator 3 may relatively decrease the reliability of at least one of a start point and an end point of the above-mentioned vector. For example, the reliability calculator 3 may set the reliability to be relatively high when an angle between the above-mentioned vector and the orientation of the viewpoint Vp is close to 90° or 270°.

Information used for the reliability calculator 3 to calculate the point reliability information Dp1 may be one kind or two or more kinds from the distance information, the spatial frequency information, the vector information, and the position information on the detection device 1 described above. The point cloud data D13 used for the reliability calculator 3 to calculate the point reliability information Dp1 may be generated by the information calculator 4 using the reliability information Dp or may be generated by the information calculator 4 without using the reliability information Dp.

For example, the reliability calculator 3 calculates reliability information Dp (line reliability information Dp2) on information on lines. For example, the reliability calculator 3 may calculate the line reliability information Dp2 by arithmetic mean, geometric mean, or weighted average of point reliability information Dp1 on two points corresponding to end points of a line. For example, the reliability calculator 3 may calculate (evaluate) the reliability of the line by comparing a value of a lower reliability of the two end points with a threshold. The reliability calculator 3 may calculate line reliability information by using the line information D21. For example, similarly to the calculation of the point reliability information Dp1 using the point cloud data D13 described above, the reliability calculator 3 may calculate the line reliability information Dp2 by using at least one of the distance information, the vector information, and the position information on the detection device 1 described above. The reliability calculator 3 stores the calculated line reliability information Dp2 in the memory 6.

For example, the reliability calculator 3 calculates reliability information Dp on surface information (the surface reliability information Dp3). For example, the reliability calculator 3 may calculate surface reliability information Dp3 by arithmetic mean, geometric mean, or weighted average using line reliability information Dp2 on lines corresponding to the outer peripheral lines of a surface. The reliability calculator 3 may calculate reliability information by using the normal direction of the surface and the position information (for example, orientation of the viewpoint Vp) of the detection device 1. For example, the reliability calculator 3 may calculate the surface reliability information Dp3 in accordance with an angle between the normal vector of the surface and the orientation of the viewpoint Vp. For example, when the angle between the normal vector of the surface and the orientation of the viewpoint Vp is close to 0° or 180° (for example, when the surface and the line of sight are close to being parallel), the reliability calculator 3 may set the reliability of the surface to be relatively low. For example, when the angle between the normal vector of the surface and the orientation of the viewpoint Vp is close to 90° or 270° (when the surface and the line of sight are close to being perpendicular), the reliability calculator 3 may set the reliability of the surface to be relatively high. The reliability calculator 3 stores the calculated surface reliability information Dp3 in the memory 6.

For example, the information calculator 4 may calculate surface information by using reliability information Dp. For example, the information calculator 4 may calculate line information D21 by excluding information on points at which the reliability is lower than a threshold or a relative value. The information calculator 4 may calculate line information D21 by interpolating point cloud data D13 by using information on points at which the reliability is equal to or higher than a threshold or a relative value. For example, the information calculator 4 may generate information in which line information D21 and line reliability information Dp2 are associated with each other. For example, the information calculator 4 may calculate information in which indices or three-dimensional coordinates of end points of lines included in line information D21 and the reliabilities of the lines (line reliability information Dp2) are associated with each other. For example, this information may have a data structure in which the indices or three-dimensional coordinates of the end points and the reliabilities are paired. For example, the information calculator 4 may store information in which the line information D21 and the line reliability information Dp2 are associated with each other in the memory 6. The information calculator 4 may calculate surface information D22 by excluding line information D21 in which the reliability is lower than a threshold or a relative value. The information calculator 4 may calculate surface information D22 by interpolating line information D21 by using line information D21 in which the reliability is equal to or higher than a threshold or a relative value. For example, the information calculator 4 may generate information in which surface information D22 and surface reliability information Dp3 are associated with each other. For example, the information calculator 4 may calculate information in which line information D21 on the outer peripheral line in the surface information D22 and the reliability of the outer peripheral line (line reliability information Dp2) are associated with each other. For example, this information may have a data structure in which an index of the outer peripheral line and the reliability are paired. For example, the information calculator 4 may store information in which the surface information D22 and the surface reliability information Dp3 are associated with each other in the memory 6.

The information calculator 4 is not necessarily required to use the reliability information Dp when generating the surface information D14. For example, the information calculator 4 may generate point cloud data D13 by using reliability information Dp, and is not necessarily required to use reliability information Dp when generating surface information D14 based on the point cloud data D13. The information calculator 4 may generate line information D21 by using point reliability information Dp1, and is not necessarily required to use line reliability information Dp2 when generating surface information D22 based on the line information D21.

As illustrated in FIG. 2A, the information processor 5 uses first object information D1 (input data) and reliability information Dp to generate second object information D2 (output data) whose data amount is smaller than that of the first object information D1. For example, the information processor 5 uses depth information D12 obtained from detection results of the distance measurer 12 as the first object information. For example, the information processor 5 includes a depth information adjuster 31, and the depth information adjuster 31 selects, based on the reliability information, information to be included in the second object information from the depth information D12 (first object information). For example, the depth information adjuster 31 determines, based on the reliability information Dp, whether to reduce the data amount for each region (for example, one pixel or a plurality of pixels in the depth image) in a data space represented by the depth information D12. For example, the depth information adjuster 31 determines, for each region (for example, one pixel or a plurality of pixels in the depth image) in a data space represented by the depth information D12, the reduction amount of the data amount in accordance with the value of the reliability. For example, the depth information adjuster 31 decreases the resolution of a part where the reliability is lower than a threshold or a part where the reliability is lower than those in other parts in the depth information (depth image), thereby generating depth information having a reduced data amount as the second object information. For example, the depth information adjuster 31 stores (updates) the depth information D12 having the reduced data amount in the memory 6, thereby updating the depth information D12.

For example, the information processor 5 uses point cloud data D13 as first object information (input data), and generates point cloud data D13 having the reduced data amount as second object information (output data). For example, the information processor 5 includes a point cloud data adjuster 32, and the point cloud data adjuster 32 selects, based on the reliability information Dp, information to be included in the second object information from the point cloud data D13. For example, the point cloud data adjuster 32 selects, based on the point reliability information Dp1 on the point cloud data D13, information to be included in the second object information from the point cloud data D13.

Figure 8A:
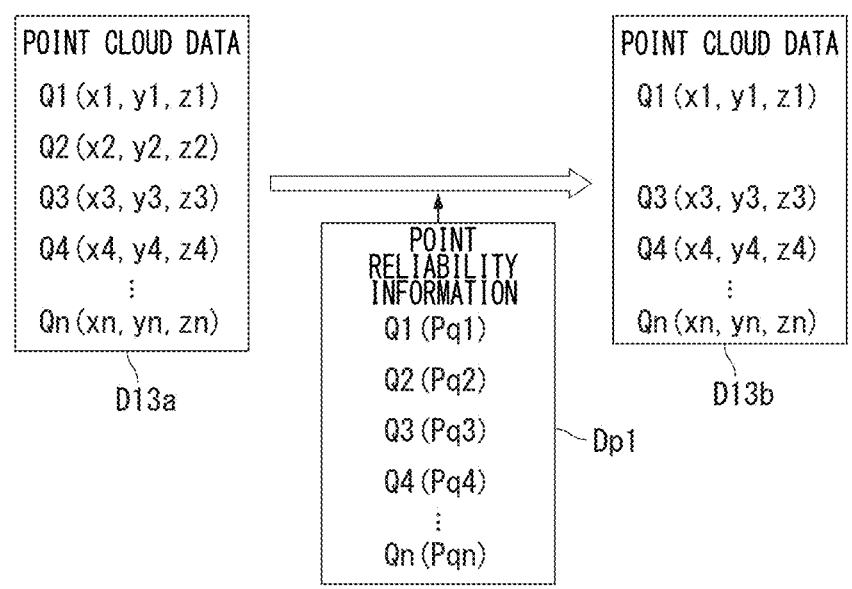
FIGS. 8A to 8C include conceptual diagrams illustrating processing of an information processor according to the first embodiment.

FIG. 8A is a conceptual diagram of processing of the point cloud data adjuster 32. Point cloud data D13a (first object information) includes the three-dimensional coordinates of a point Q1, a point Q2, a point Q3, a point Q4, ..., and a point Qn. The three-dimensional coordinates of the point Q1 are represented by Q1(x1,y1,z1), and the three-dimensional coordinates of the points Q2 to Qn are similarly represented. The point reliability information Dp1 includes the reliability of each of the points Q2 to Qn. The reliability of the point Q1 is represented by Q1(Pq1), and reliabilities of the points Q2 to Qn are similarly represented. For example, the point cloud data adjuster 32 compares the reliability Q1(Pq1) with a threshold, and when the reliability Q1(Pq1) is equal to or larger than the threshold, determines to include the Q1(x1, y1,z1) in the point cloud data D13b. For example, when the reliability Q1(Pq1) is smaller than the threshold, the point cloud data adjuster 32 determines not to include the Q1(x1, y1,z1) in the point cloud data D13b. For example, in FIG. 8A, the reliability Q2(Pq2) of the point Q2 is smaller than the threshold, and the point cloud data adjuster 32 generates point cloud data D13b by excluding the three-dimensional coordinates Q2(x2,y2,z2) of the point Q2. For example, the point cloud data adjuster 32 reduces the number of points included in the point cloud data D13b in the second object information to be smaller than the point cloud data D13a in the first object information.

The point cloud data adjuster 32 may compare reliabilities between a first part (for example, the point Q1) of the object OB and a second part (for example, one or a plurality of points other than the point Q1), and determine whether to include the three-dimensional coordinates of the first part (for example, the point Q1) in the point cloud data D13b. The point cloud data adjuster 32 may represent coordinates of at least a part of points included in the point cloud data D13b in the second object information by a data amount (for example, the number of bits) smaller than that of the point cloud data D13a in the first object information. For example, the point cloud data adjuster 32 may reduce, instead of excluding the three-dimensional coordinates of points from the point cloud data D13b, the data amount (the number of bits) of the three-dimensional coordinates of the points, thereby selecting information to be included in the point cloud data D13b. For example, in FIG. 8A, the point cloud data adjuster 32 may select information to be included in the point cloud data D13b by reducing the number of bits of information (x2,y2,z2) representing the three-dimensional coordinates of the point Q2 and including the information (x2,y2,z2) in the point cloud data D13b.

Referring back to the description with reference to FIG. 4, the point cloud data adjuster 32 stores the point cloud data D13 (point cloud data D13b in FIG. 8A) having the reduced data amount in the memory 6. For example, the point cloud data adjuster 32 updates the point cloud data D13 stored in the memory 6 with the point cloud data D13 having the reduced data amount. For example, the information calculator 4 uses the point cloud data D13 having the reduced (updated) data amount to calculate the surface information D14. In this case, for example, the load on the information calculator 4 is able to be reduced. The information processor 5 may adjust the precision of calculation based on the reliability information. For example, when the reliability is equal to or higher than a threshold or equal to or higher than a relative value, the information processor 5 may perform calculation with first precision (for example, a double precision floating point number), and when the reliability is lower than the threshold or lower than the relative value, the information processor 5 may perform calculation with second precision (for example, a single precision floating point number) lower than the first precision. In this case, for example, the load on the information calculator 4 is able to be reduced. For example, when the load on the information calculator 4 is reduced, the information calculator 4 is easily applicable to a portable device.

For example, the information processor 5 uses surface information D14 as first object information (input data) to generate surface information D14 having the reduced data amount as second object information (output data). For example, the information processor 5 includes a line information adjuster 33, and the line information adjuster uses line information D21 as the first object information to select, based on the reliability information Dp, information to be included in the second object information from the line information D21. For example, the line information adjuster 33 selects, based on the line reliability information Dp2, information to be included in the second object information from the line information D21. For example, the information processor 5 includes a surface information adjuster 34, and the surface information adjuster 34 uses surface information D22 as the first object information to select, based on the reliability information, information to be included in the second object information from the surface information D22.

Figure 8B:
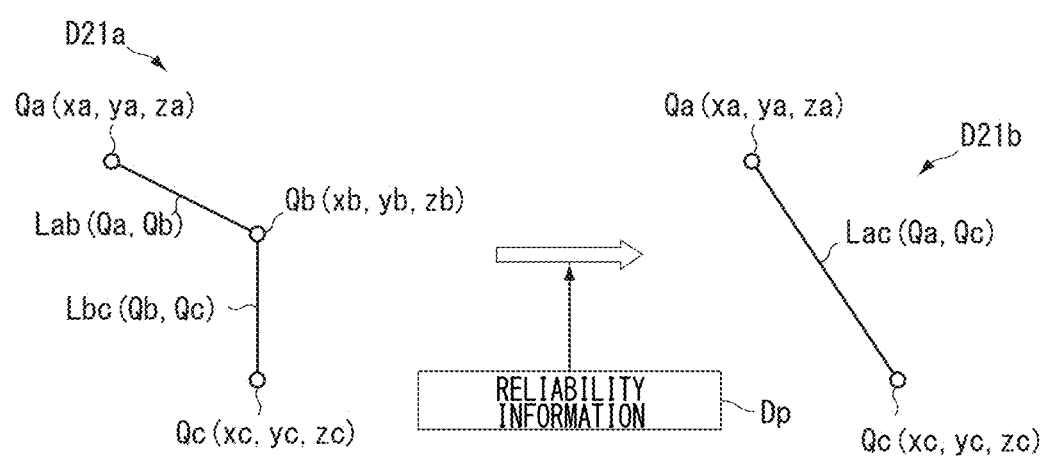

FIG. 8B is a conceptual diagram illustrating an example of processing of the line information adjuster 33. For example, line information D21a (first object information) includes information on a line Lab and information on a line Lbc. For example, the information on the line Lab includes connection information on end points (point Qa, point Qb) thereof, and includes information in which an index of the point Qa and an index of the point Qb are paired. The information on the line Lbc is similar to the information on the line Lab, and includes information in which an index of the point Qb and an index of the point Qc are paired. In FIG. 8B, the information on the line Lab is represented by symbol Lab(Qa,Qb), and information on other lines is similarly represented.

The line information adjuster 33 uses line information D21a and reliability information Dp to generate line information D21b (second object information). For example, the reliability information Dp used here is at least one of the point reliability information Dp1 and the line reliability information Dp2 illustrated in FIG. 4. For example, the line information adjuster 33 reduces the number of lines included in the line information D21b in the second object information to be smaller than that of the line information D1a in the first object information. For example, the line information adjuster 33 compares the reliability of the point Qb in the point reliability information Dp1 with a threshold, and when the reliability of the point Qb is lower than the threshold, deletes information on the line Lab and the line Lbc that include the point Qb. For example, the line information adjuster 33 generates information on a line Lac connecting the point Qa and the point Qc, which are end points other than the point Qb in the line Lab and the line Lbc, and includes information on the line Lac in the line information D21b. Information on a line from the point Qa to the point Qc is information on the line Lab and information on the line Lbc in the line information D21a, but is information on the line Lac in the line information D21b. The data amount of the line information D21b is reduced as compared with the line information D21a.

In the above description, the line information adjuster 33 deletes information on the line Lab and the line Lbc that include the point Qb whose reliability is lower than the threshold, but may use the line reliability information Dp2 to delete information on the line Lab and the line Lbc whose reliabilities are lower than the threshold. In this case, the line information adjuster 33 may or may not include information on the line Lac in the line information D21b. The information on the line Lac may be calculated by the line information adjuster 33 or the information calculator 4. For example, the information calculator 4 may calculate line information D21 again by using line information D21b from which information on the line Lab and the line Lbc has been deleted or point cloud data D13 from which information on the point Qb has been deleted.

The line information adjuster 33 stores the line information D21b having the reduced data amount in the memory 6. For example, the line information adjuster 33 updates the line information D21a stored in the memory 6 with the line information D21b having the reduced data amount. For example, the information calculator 4 uses the line information D21b having the reduced (updated) data amount to calculate the surface information D22. In this case, for example, the load on the information calculator 4 is able to be reduced. The information processor 5 may adjust the precision of calculation based on the reliability information. For example, when the reliability is equal to or higher than a threshold or equal to or higher than a relative value, the information processor 5 may perform calculation with first precision (for example, a double precision floating point number), and when the reliability is lower than the threshold or lower than the relative value, the information processor 5 may perform calculation with second precision (for example, a single precision floating point number) lower than the first precision. In this case, for example, the load on the information calculator 4 is able to be reduced. For example, when the load on the information calculator 4 is reduced, the information calculator 4 is easily applicable to a portable device.

Figure 8C:
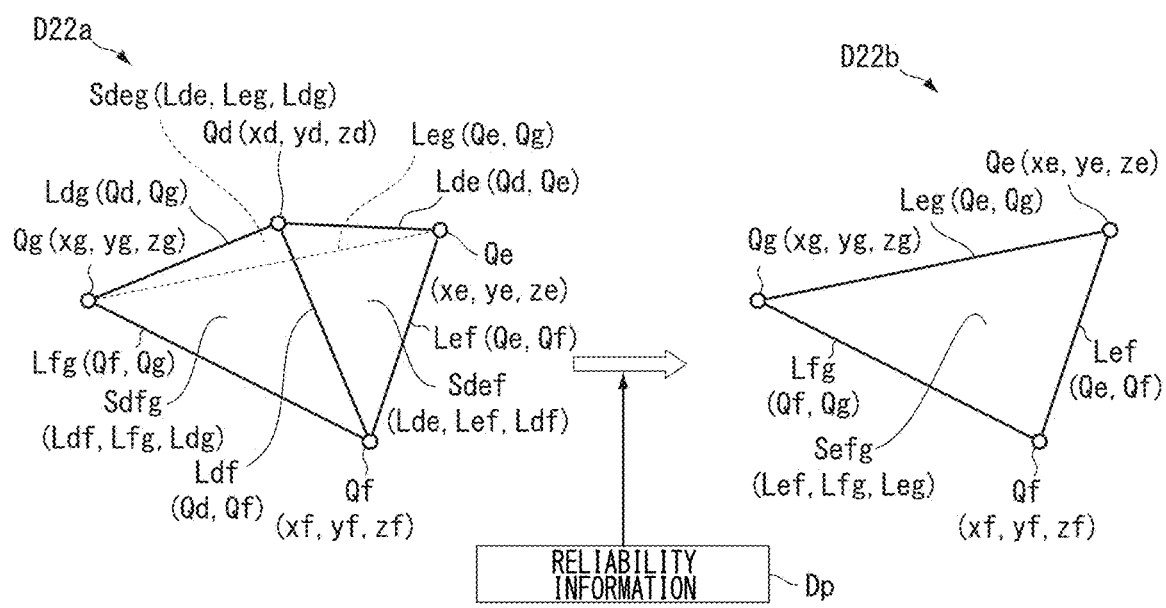

FIG. 8C is a conceptual diagram illustrating an example of processing of the surface information adjuster 34. For example, the surface information D22a (first object information) includes information on a surface Sdef, information on a surface Sed, information on a surface Sdfg, and information on a surface deg. The surface def is a surface whose outer periphery is a line Lde, a line Lef, and a line Ldf, and, for example, includes an index of the line Lde, an index of the line Lef, and an index of the line Ldf. Information on the surface def is represented by Sdef(Lde,Lef, Ldf), and information on other surfaces is similarly represented.

The surface information adjuster 34 uses the surface information D22a and the reliability information Dp to generate surface information D22b (second object information). For example, the reliability information Dp used here is at least one of the point reliability information Dp1, the line reliability information Dp2, and the surface reliability information Dp3 illustrated in FIG. 4. The surface information adjuster 34 reduces the number of surfaces included in the surface information D22b in the second object information to be smaller than that of the surface information D22a in the first object information. For example, the surface information adjuster 34 compares an reliability of the point Qd in the point reliability information Dp1 with a threshold, and when the reliability of the point Qd is lower than the threshold, deletes information on a surface Sdef, a surface Sdfg, and a surface Sdeg that include the point Qd. For example, the line information adjuster 33 generates information on the surface Sefg surrounded by a line Lef, a line Lfg, and a line Leg that do not include the point Qd among the outer peripheral line of the surface Sdef, the outer peripheral line of the surface Sdfg, and the outer peripheral line of the surface Sdeg, and includes the information on the surface Sefg in the surface information D22b. The information on the surface including the point Qf is information on the surface Sdef, information on the surface Sdfg, and information on the surface Sdeg in the surface information D22a, but is information on the surface Sefg in the surface information D22b. The data amount of the surface information D22b is reduced as compared with the surface information D22a.

In the above description, the surface information adjuster 34 deletes information on the surface Sdef, the surface Sdfg, and the surface Sdeg that include the point Qd whose reliability is lower than a threshold, but may use line reliability information Dp2 to delete information on surfaces including at least one of the line Lde, the line Ldf, and the line Ldg whose reliabilities are lower than a threshold. The surface information adjuster 34 may use surface reliability information Dp3 to delete at least one of information on the surface Sdef, information on the surface Sdfg, and information on the surface Sdeg whose reliabilities are lower than a threshold. In this case, the surface information adjuster 34 may or may not include information on the surface Sefg in the surface information D22b. The information on the surface Sefg may be calculated by the surface information adjuster 34 or the information calculator 4. For example, the information calculator 4 may calculate surface information D22 again by using line information D21b from which the line Lde, the line Ldf, and the line Ldg have been deleted or point cloud data D13 from which information on the point Qd has been removed. The surface information adjuster 34 stores the surface information D22b having the reduced data amount in the memory 6. In this case, for example, the communication amount used to output the surface information D22 to the outside is able to be reduced, and the load on processing (rendering processing) using the surface information D22 is able to be reduced.

Referring to the description with reference to FIG. 4, for example, the information processor 5 uses texture information D15 as the first object information. For example, the information processor 5 includes a texture information adjuster 35, and the texture information adjuster 35 adjusts the compression ratio of the texture information D15 for each part of the object OB based on the reliability information Dp. For example, the texture information adjuster 35 uses surface reliability information Dp3 to adjust the compression ratio of the texture information D15 corresponding to each surface. For example, the texture information adjuster 35 adjusts the compression ratio of texture information attached to a surface whose reliability is equal to or higher than a threshold to be a first compression ratio (for example, non-compression), and adjusts the compression ratio of texture information attached to a surface whose reliability is lower than the threshold to be a second compression ratio higher than the first compression ratio. For example, the texture information adjuster 35 decreases the number of colors used for texture information on at least a part of the object OB in the second object information to be smaller than that for texture information in the first object information. For example, in the texture information in the first object information, RGB of an image (texture) of each part of the object OB are expressed by (256×256×256) kinds of colors represented by 8 bits (256 grayscales). For example, the texture information adjuster 35 decreases the number of bits (grayscale) of at least one of RGB in a part of the object OB where the reliability is relatively low, thereby decreasing the number of colors in the second object information. For example, the texture information adjuster 35 expresses RGB of an image (texture) of a part of the object OB where the reliability is relatively low by (16×16×16) kinds of colors represented by 4 bits (16 grayscales). The texture information adjuster stores the texture information D15 having the reduced data amount in the memory 6. For example, the texture information adjuster 35 overwrites the texture information D15 having the reduced data amount to update the texture information D15.

The reliability calculator 3 is not necessarily required to calculate a part of the depth reliability information Dp4, the point reliability information Dp1, the line reliability information Dp2, and the surface reliability information Dp3. The information processor 5 is not necessarily required to include a part of the depth information adjuster 31, the point cloud data adjuster 32, the line information adjuster 33, the surface information adjuster 34, and the texture information adjuster 35. After information is updated by the information processor 5, the information calculator 4 may use the updated information to calculate at least a part of model information again.

Figure 9:
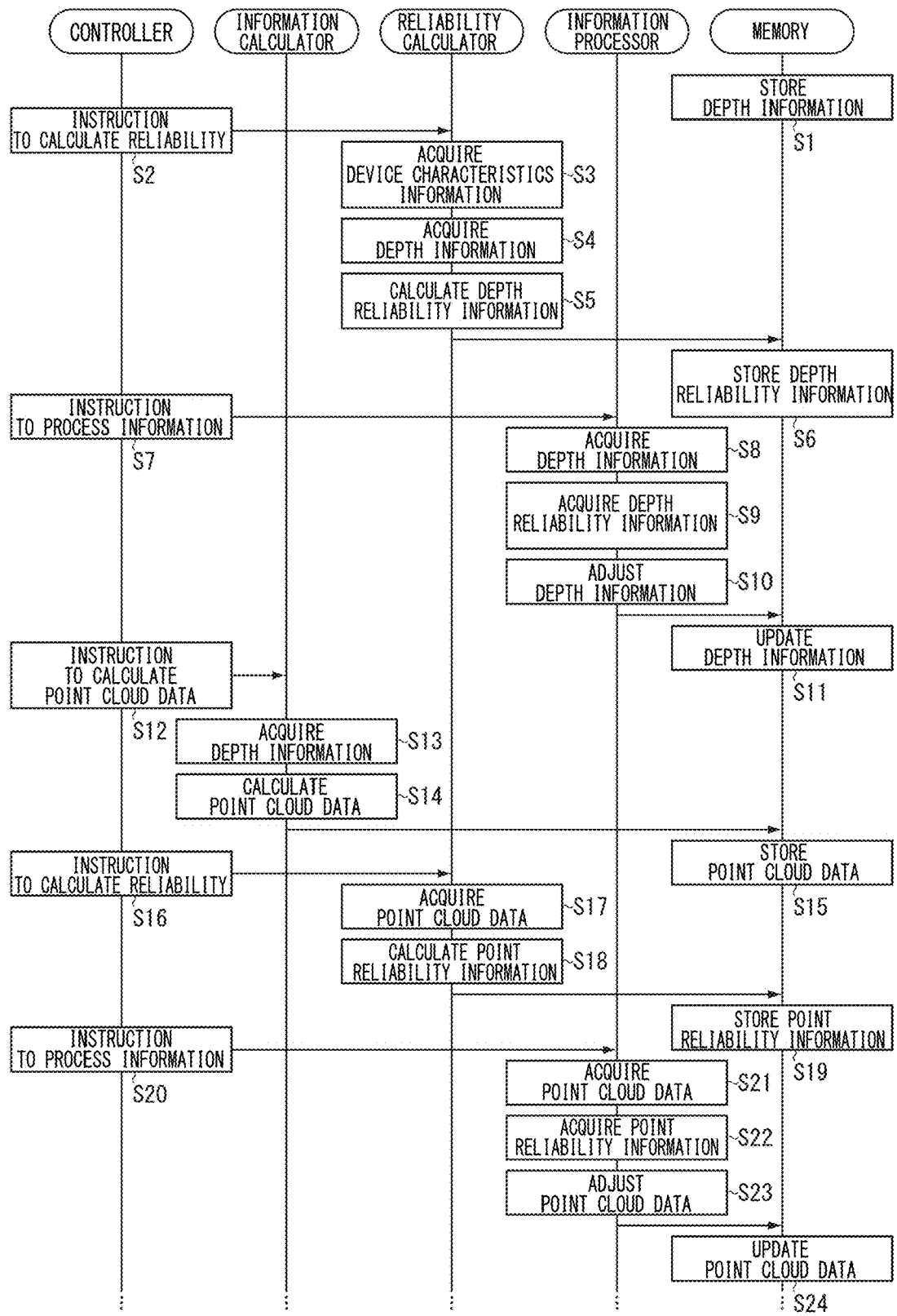
FIG. 9 is a sequence diagram illustrating a detection method according to the first embodiment.
Figure 10:
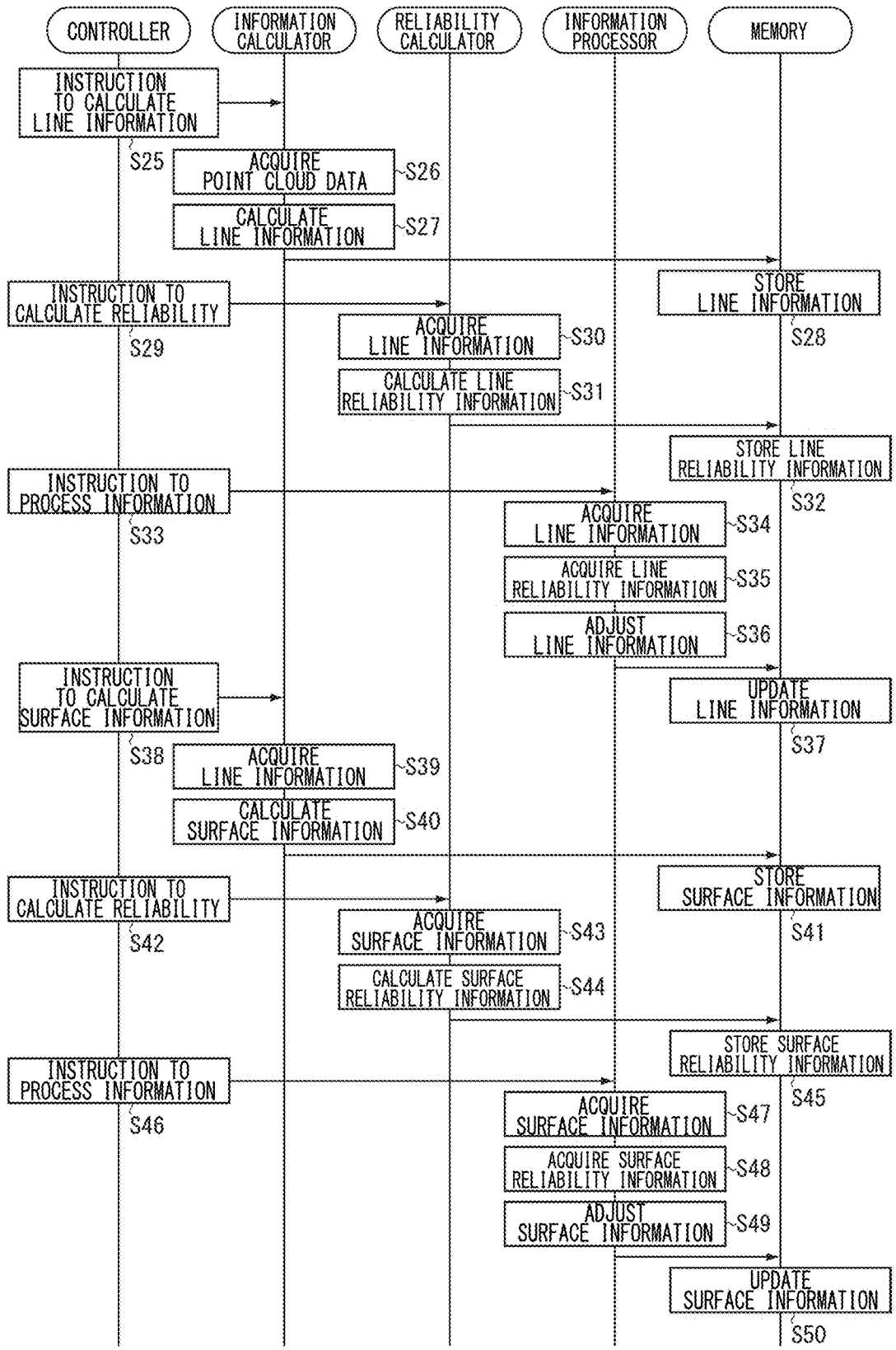
FIG. 10 is a sequence diagram following FIG. 9.

Next, an example of a detection method according to the embodiment is described based on the configuration of the above-mentioned detection device 1. FIG. 9 and FIG. 10 are sequence diagrams illustrating an example of the detection method according to the embodiment. In the first embodiment, prior to the calculation of model information, the controller 8 controls the detector 2 to detect an object OB, and, for example, in Step S1, the memory 6 stores therein depth information D12 as detection results of the detector 2. In Step S2, the controller 8 transmits an instruction to calculate the reliability to the reliability calculator 3. In Step S3, for example, the reliability calculator 3 acquires device characteristics information D16 stored in the memory 6 in advance, and in Step S4, acquires depth information D12 from the memory 6. In Step S5, the reliability calculator 3 calculates depth reliability information Dp4 by using at least one of the device characteristics information D16 and the depth information D12, and in Step S6, the memory 6 stores the depth reliability information Dp4 therein. In Step S7, the controller 8 transmits an information processing instruction to the information processor 5. In Step S8, the information processor 5 acquires the depth information D12 from the memory 6, and in Step S9, acquires the depth reliability information Dp4 from the memory 6. In Step S10, the information processor 5 adjusts the depth information D12. For example, the information processor 5 uses the depth information D12 as the first object information, and generates second object information based on the depth reliability information Dp4. In Step S11, the memory 6 updates the depth information D12 with the depth information D12 adjusted by the information processor 5.

In Step S12, the controller 8 supplies an instruction to calculate point cloud data D13 to the information calculator 4. In Step S13, the information calculator 4 acquires the depth information D12 from the memory 6. In Step S14, the information calculator 4 uses the depth information D12 to calculate the point cloud data D13, and in Step S15, the memory 6 stores the point cloud data D13 therein. In Step S16, the controller 8 transmits an instruction to calculate the reliability to the reliability calculator 3. In Step S17, the reliability calculator 3 acquires the point cloud data D13 from the memory 6, and in Step S18, calculates point reliability information Dp1. In Step S19, the memory 6 stores the point reliability information Dp1 therein. In Step S20, the controller 8 transmits an information processing instruction to the information processor 5. In Step S21, the information processor 5 acquires the point cloud data D13, and in Step S22, acquires the point reliability information Dp1. In Step S23, the information processor 5 adjusts the point cloud data D13. For example, the information processor 5 uses the point cloud data D13 as the first object information, and generates second object information based on the point reliability information Dp1. In Step S24, the memory 6 updates the point cloud data D13 with the point cloud data D13 adjusted by the information processor 5.

In Step S25 in FIG. 10, the controller 8 supplies an instruction to calculate line information D21 to the information calculator 4. In Step S26, the information calculator 4 acquires the point cloud data D13 from the memory 6. In Step S27, the information calculator 4 uses the point cloud data D13 to calculate the line information D21, and in Step S28, the memory 6 stores the line information D21 therein. In Step S29, the controller 8 transmits an instruction to calculate the reliability to the reliability calculator 3. In Step S30, the reliability calculator 3 acquires the line information D21 from the memory 6, and in Step S31, calculates line reliability information Dp2. In Step S32, the memory 6 stores the line reliability information Dp2 therein. In Step S33, the controller 8 transmits an information processing instruction to the information processor 5. In Step S34, the information processor 5 acquires the line information D21, and in Step S35, acquires the line reliability information Dp2. In Step S36, the information processor 5 adjusts the line information D21. For example, the information processor 5 uses the line information D21 as the first object information, and generates second object information based on the line reliability information Dp2. In Step S37, the memory 6 updates the line information D21 with the line information D21 adjusted by the information processor 5.

In Step S38, the controller 8 supplies an instruction to calculate surface information D22 to the information calculator 4. In Step S39, the information calculator 4 acquires the line information D21 from the memory 6. In Step S40, the information calculator 4 uses the line information D21 to calculate the surface information D22, and in Step S41, the memory 6 stores the surface information D22 therein. In Step S42, the controller 8 transmits an instruction to calculate the reliability to the reliability calculator 3. In Step S43, the reliability calculator 3 acquires the surface information D22 from the memory 6, and in Step S44, calculates surface reliability information Dp3. In Step S45, the memory 6 stores the surface reliability information Dp3 therein. In Step S46, the controller 8 transmits an information processing instruction to the information processor 5. In Step S47, the information processor 5 acquires the surface information D22, and in Step S48, acquires the surface reliability information Dp3. In Step S49, the information processor 5 adjusts the surface information D22. For example, the information processor 5 uses the surface information D22 as the first object information, and generates second object information based on the surface reliability information Dp3. In Step S50, the memory 6 updates the surface information D22 with the surface information D22 adjusted by the information processor 5.

The information processor 5 (information processing device) is provided in the detection device 1, but may be provided outside the detection device 1. For example, the information processing device according to the embodiment may receive first object information and reliability information from an external device, and use the received first object information and the received reliability information to generate second object information. The information processing device according to the embodiment may include the information calculator 4 and the information processor 5 in FIG. 4, calculate first object information by its own device, and receive reliability information from an external device. The detection device 1 may use reliability information received from an external device (for example, the information processing device 51 illustrated in FIG. 12 referred to later) or a server. In this case, the reliability calculator 3 is able to be omitted.

Second Embodiment

A second embodiment is described. In the second embodiment, the same configurations as in the above-mentioned embodiment are denoted by the same reference symbols, and descriptions thereof are omitted or simplified.

In the above-mentioned embodiment, the information calculator 4 and the information processor 5 include a computer system, for example. The information calculator 4 and the information processor 5 read a detection program stored in the memory 6, and execute various kinds of processing in accordance with the detection program. For example, the detection program causes a computer to execute: calculating reliability information on an object OB from a viewpoint Vp; using detection results of the object OB from the one viewpoint Vp to calculate model information including at least one of shape information and texture information on the object OB at the viewpoint Vp; and using first object information including the model information or source data used for generation of the model information and using the reliability information to generate second object information having a reduced data amount of the model information or the source data. The detection program may be recorded in a computer-readable storage medium to be provided.

Third Embodiment

Figure 11:
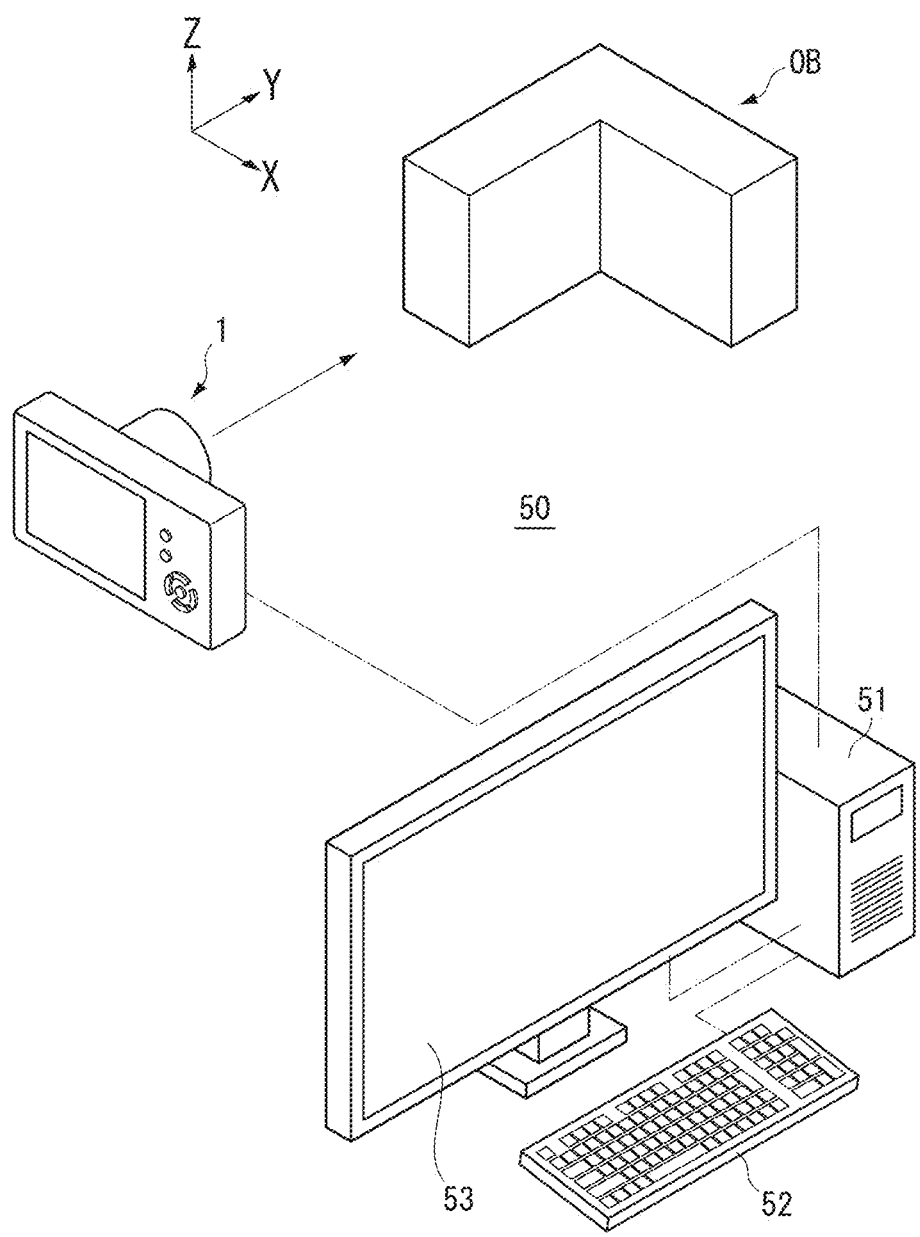
FIG. 11 is a diagram illustrating a detection system according to a third embodiment.

A third embodiment is described. In the third embodiment, the same configurations as in the above-mentioned embodiments are denoted by the same reference symbols, and descriptions thereof are omitted or simplified. FIG. 11 is a diagram illustrating an example of a detection system 50 according to the third embodiment. The detection system 50 includes the detection device 1 and an information processing device 51 that processes information output from the detection device 1. For example, the information processing device 51 is provided with an input device 52 and a display device 53.

The information processing device 51 communicates with the detection device 1 to acquire information from the detection device 1. For example, the information processing device 51 uses information acquired from the detection device 1 (for example, model information, reliability information) to execute rendering processing. For example, the information processing device 51 calculates, based on viewpoint setting information input to the input device 52 by a user, data on an estimated image of an object OB as viewed from the set viewpoint. For example, the information processing device 51 supplies data on the estimated image to the display device 53, and displays the estimated image on the display device 53.

For example, the input device 52 includes at least one of a keyboard, a mouse, a touch panel, a sensor such as an acceleration sensor, a voice input device, and a touch pen. The input device 52 is connected to the information processing device 51. For example, the input device 52 receives an input of information from a user, and supplies the input information to the information processing device 51. For example, the display device 53 includes a liquid crystal display or a touch panel display, and is connected to the information processing device 51. For example, the display device 53 displays an image (for example, an image estimated by rendering processing) based on image data supplied from the information processing device 51.

Figure 12:
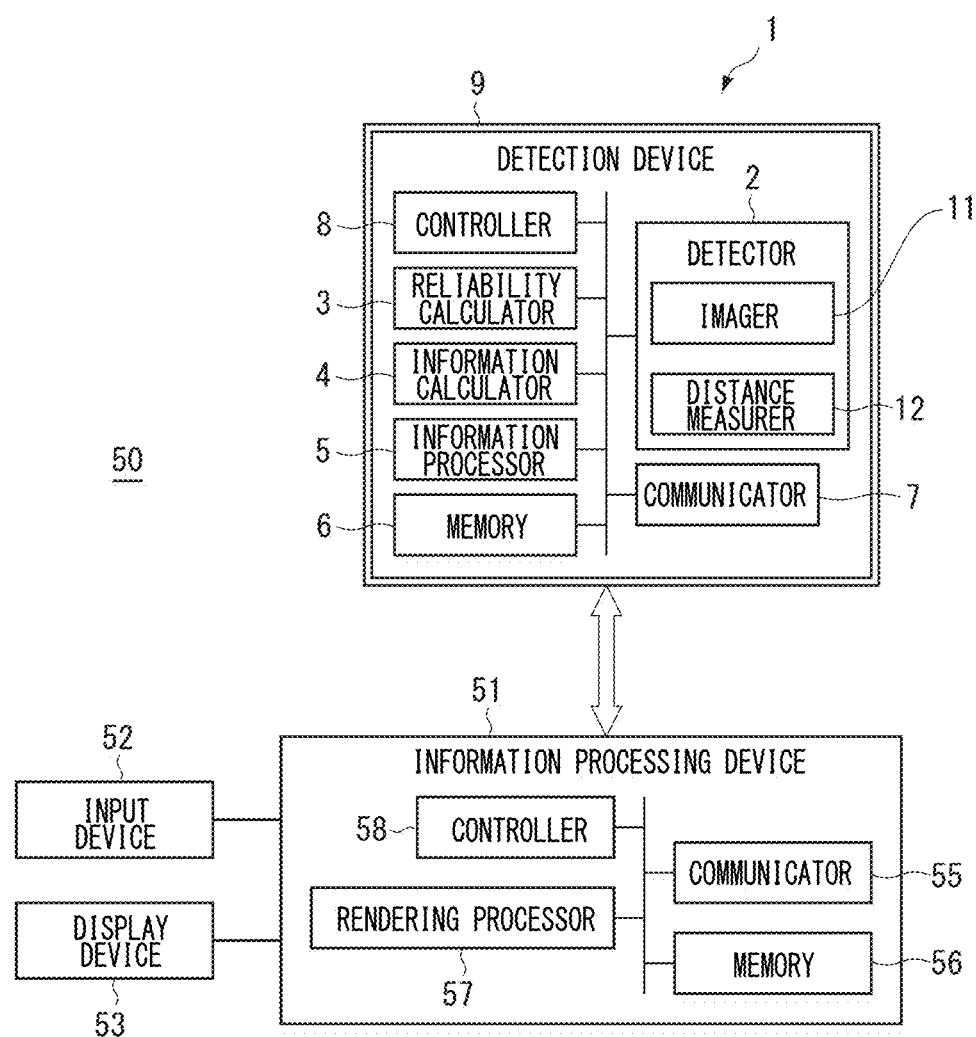
FIG. 12 is a block diagram illustrating the detection system according to the third embodiment.

FIG. 12 is a block diagram illustrating an example of the detection system 50 according to the third embodiment. The information processing device 51 includes a communicator 55, a memory 56, a rendering processor 57, and a controller 58. For example, the communicator 55 includes at least one of a USB port, a network card, and a communication device that performs wireless communication by radio waves or infrared rays. The communicator 55 is able to communicate with the communicator 7 in the detection device 1.

For example, the memory 56 includes a removable storage medium such as a USB memory or a mass storage device such as an external or built-in hard disk. For example, the memory 56 stores therein data on at least a part of the information received through the communicator 55, an imaging control program for controlling the detection device 1, and a processing program for executing each piece of processing in the information processing device 51.

For example, the rendering processor 57 includes a graphics processing unit (GPU). The rendering processor 57 may be configured such that a CPU and a memory execute each piece of processing in accordance with an image processing program. For example, the rendering processor 57 performs at least one of drawing processing, texture mapping processing, and shading processing.

In the drawing processing, for example, the rendering processor 57 is able to calculate an estimated image (for example, reconstructed image) of a shape determined by shape information in model information as viewed from a certain viewpoint. In the following description, the shape represented by the shape information is referred to as "model shape". In the drawing processing, for example, the rendering processor 57 is able to reconstruct a model shape (for example, estimated image) from model information (for example, shape information). For example, the rendering processor 57 stores data on the calculated estimated image in the memory 56. In the texture mapping processing, for example, the rendering processor 57 is able to calculate an estimated image obtained by attaching an image represented by texture information in model information to the surface of an object on the estimated image. The rendering processor 57 is also able to calculate an estimated image obtained by attaching a texture different from the object OB to the surface of the object on the estimated image. In the shading processing, for example, the rendering processor 57 is able to calculate an estimated image obtained by adding a shade formed by a light source represented by light source information in model information to an object on the estimated image. In the shading processing, for example, the rendering processor 57 is able to calculate an estimated image obtained by adding a shade formed by a desired light source to an object on the estimated image.

For example, the rendering processor 57 performs rendering processing by using reliability information generated by the detection device 1. For example, the rendering processor 57 may increase the resolution in a region where the reliability is relatively high in the model shape to be higher than the resolution in a region where the reliability is relatively low. For example, the rendering processor 57 may generate an estimated image by decreasing the resolution in a region where the reliability is relatively low in the model shape (for example, blur). For example, the rendering processor 57 may omit or simplify rendering processing on a region where the reliability is relatively low in the model shape. For example, the rendering processor 57 may perform rendering processing by interpolating a region where the reliability is relatively low in the model shape by using a region where the reliability is relatively high.

For example, the controller 58 controls the units in the information processing device 51, the detection device 1, the input device 52, and the display device 53. For example, the controller 58 controls the communicator 55 to transmit instructions (control signals) and setting information to the detection device 1. For example, the controller 58 stores, in the memory 56, information received by the communicator 55 from the detection device 1. For example, the controller 58 controls the rendering processor 57 to execute rendering processing.

The detection system 50 is not necessarily required to include the input device 52. For example, the detection system 50 may input various kinds of instructions and information through the communicator 7. The detection system 50 is not necessarily required to include the display device 53. For example, the detection system 50 may output data on estimated images generated by the rendering processing to an external display device, and the display device may display estimated images.

Fourth Embodiment

Figure 13:
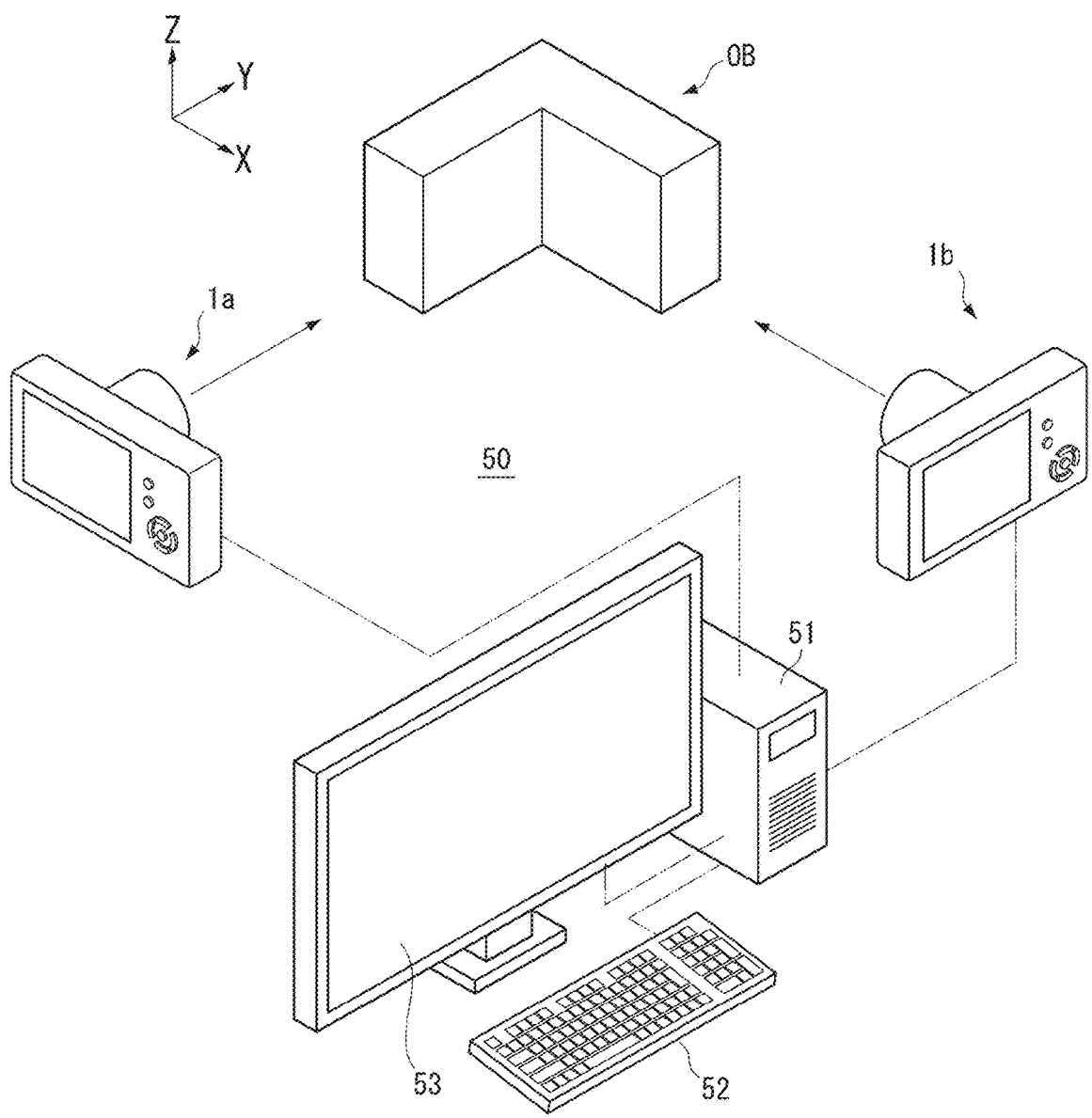
FIG. 13 is a diagram illustrating the detection system according to a forth embodiment.

A fourth embodiment is described. In the fourth embodiment, the same configurations as in the above-mentioned embodiments are denoted by the same reference symbols, and descriptions thereof are omitted or simplified. FIG. 13 is a diagram illustrating a detection system 50 according to the fourth embodiment. The detection system includes a plurality of detection devices (a first detection device 1a, a second detection device 1b), and the information processing device 51 that processes information output from a plurality of imaging devices.

The information processing device 51 communicates with the first detection device 1a to acquire information (for example, model information, reliability information) from the first detection device 1a disposed at the position of a first viewpoint for the object OB. The information processing device 51 communicates with the second detection device 1b disposed at the position of a second viewpoint for the object OB to acquire information (for example, model information, reliability information) from the second detection device 1b. The information processing device 51 performs information processing by using the information acquired from the first detection device 1a that detects the object OB from the first viewpoint and the information acquired from the second detection device 1b that detects the object OB from the second viewpoint. For example, the first detection device 1a and the second detection device 1b each supply model information representing the object OB viewed from the viewpoint (one viewpoint, single viewpoint, one direction) of the own device to the information processing device 51. The information processing device 51 performs model integration processing for integrating first model information representing the object OB viewed from the viewpoint (first viewpoint) of the first detection device 1a and second model information representing the object viewed from the viewpoint (second viewpoint different from first viewpoint) of the second detection device 1b.

Figure 14:
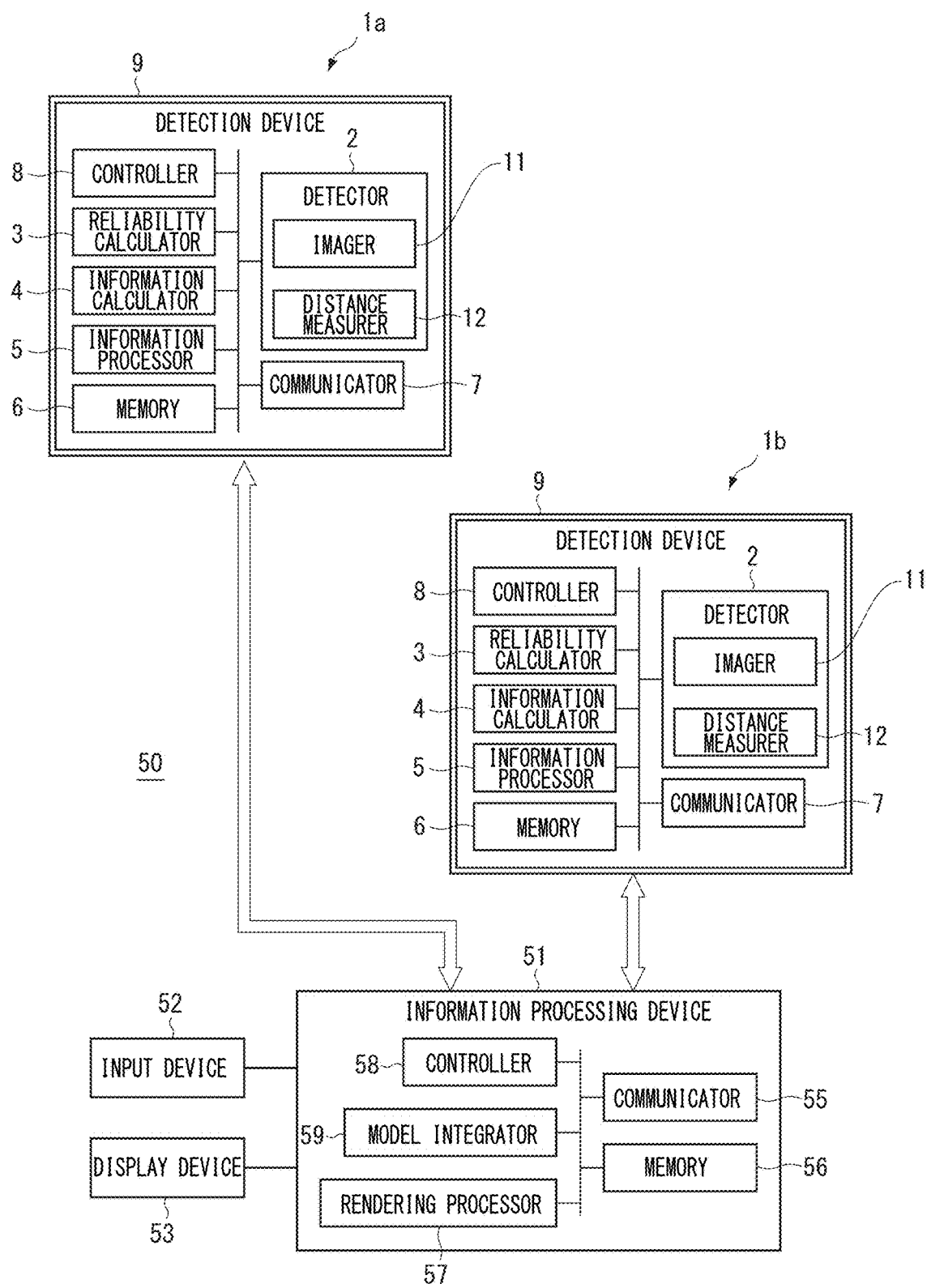
FIG. 14 is a block diagram illustrating a detection system according to the forth embodiment.

FIG. 14 is a block diagram illustrating the detection system 50 according to the fourth embodiment. For example, the first detection device 1a and the second detection device 1b have the same configuration as that of the detection device 1 illustrated in FIGS. 1A and 1B. The information processing device 51 includes a model integrator 59 that performs model integration processing. For example, the model integrator 59 extracts feature points from a shape represented by the first model information output from the first detection device 1a. The model integrator 59 extracts feature points from a shape represented by the second model information output from the second detection device 1b. The feature points are parts that are distinguishable from other parts in the shape represented by each model information. For example, a part defined as a surface in surface information is distinguishable from other surfaces based on the shape of the outer periphery of the part. For example, the model integrator 59 extracts feature points by using at least one of shape information and texture information included in each model information. For example, the model integrator matches feature points between the first model information and the second model information to detect feature points common to the first model information and the second model information. The model integrator 59 uses the feature points common to the first model information and the second model information to calculate relative positions and relative postures of the shape represented by the first model information and the shape represented by the second model information and integrate the first model information and the second model information.

For example, the model integrator 59 performs model integration processing by using at least a part of reliability information (first reliability information) supplied from the first detection device 1a and reliability information (second reliability information) supplied from the second detection device 1b. For example, the model integrator 59 selects information used for integration from model information based on the reliability information. For example, when extracting feature points from a shape represented by the model information, the model integrator extracts feature points from a region where the reliability is relatively high in the shape. For example, when a shape represented by first model information and a shape represented by second model information have an overlapping part, the model integrator 59 uses the first reliability information and the second reliability information to compare the reliability of the first model information and the reliability of the second model information in the overlapping part, and represents the shape of the overlapping part by using model information whose reliability is relatively higher. For example, the model integrator 59 may weight (weighted average calculation) the first model information and the second model information in the above-mentioned overlapping part, thereby integrating the shape information. Examples of the weighted average include arithmetic mean, geometric mean, and exponential average (exponentially weighted moving average). For example, coefficients of the weighting are determined based on the reliability of the first model information in the overlapping part and the reliability of the second model information in the overlapping part.

Figure 15:
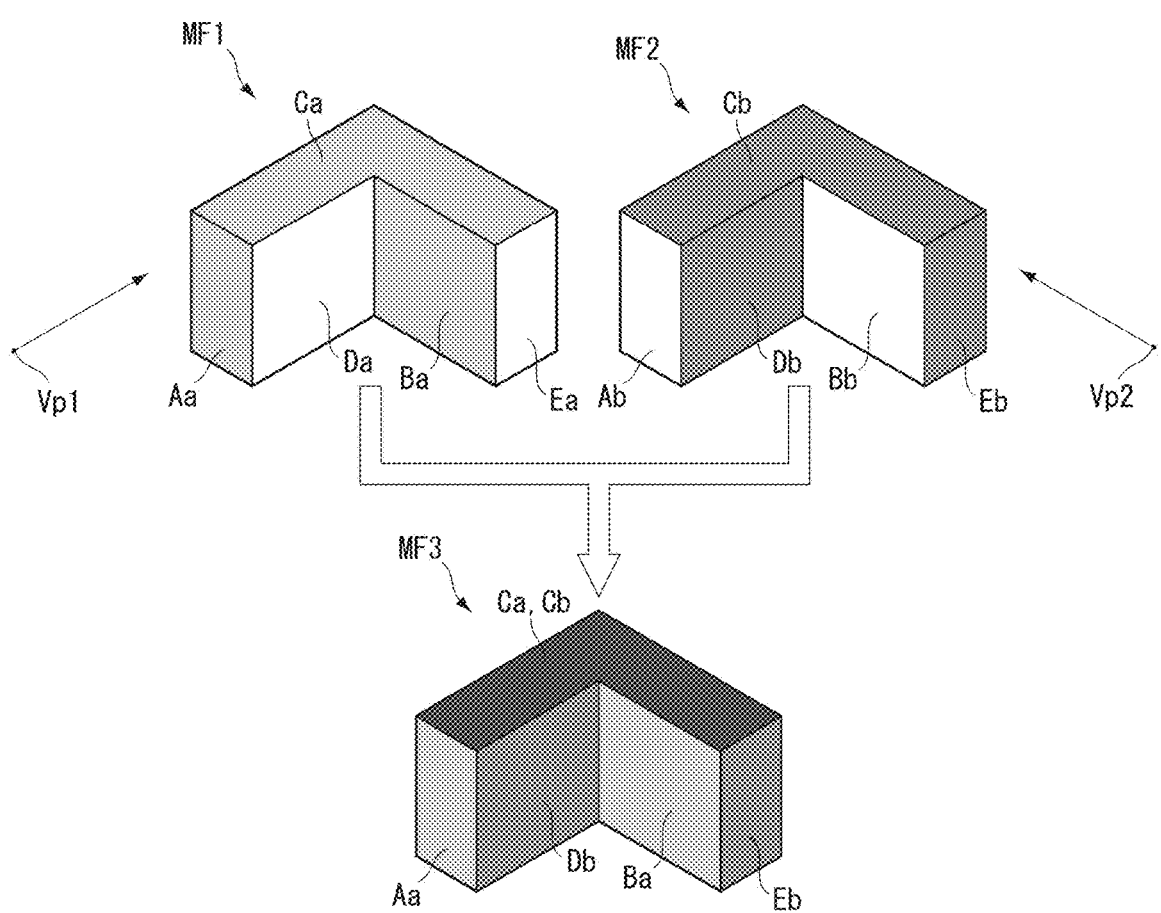
FIG. 15 is a conceptual diagram illustrating an example of model integration processing according to the present embodiment.

FIG. 15 is a conceptual diagram illustrating an example of the model integration processing. Symbol MF1 represents a model shape generated based on detection results from a viewpoint (first viewpoint) Vp1 of the first detection device 1a. Symbol MF2 represents a model shape generated based on detection results from a viewpoint (second viewpoint) Vp2 of the second detection device 1b. Symbol MF3 represents a model shape obtained by integration (integrated model shape).

In the model shape MF1 viewed from the viewpoint Vp1, for example, a surface Aa, a surface Ba, and a surface Ca have high reliability (accuracy) of detection results from the viewpoint Vp1. In the model shape MF1, for example, a surface Da and a surface Ea have low reliability (accuracy) of detection results from the viewpoint Vp1. In the model shape MF2 viewed from the viewpoint Vp2 in a direction different from the viewpoint Vp1 with respect to the object OB, for example, a surface Cb, a surface Db, and a surface Eb have high reliability (accuracy) of detection results from the viewpoint Vp2. In the model shape MF2, for example, a surface Ab and a surface Bb have low reliability (accuracy) of detection results from the viewpoint Vp2. In such a case, for example, the model integrator 59 uses the surface Aa and the surface Ab of the model shape MF1 for the generation of the model shape MF3, and uses the surface Db and the surface Eb of the model shape MF2 for the generation of the model shape MF3. For example, the model integrator 59 weights the surface Ca of the model shape MF1 and the surface Cb of the model shape MF2, which are used for C of the model shape MF3.

The method by which the model integrator 59 integrates the first model information and the second model information is not limited to the above-mentioned example. For example, the model integrator 59 may perform model integration processing by using relative positions and relative postures of the first detection device 1a and the second detection device 1b. The model integrator 59 may perform model integration processing by using relative positions of the viewpoint of the first detection device 1a and the viewpoint of the second detection device 1b and the relation between the direction (line of sight) of the viewpoint of the first detection device 1a and the direction (line of sight) of the viewpoint of the second detection device 1b. The information processing device 51 may include the model integrator 59 and is not necessarily required to include the rendering processor 57. For example, the information processing device 51 may output the result of model integration processing to an external device, and a rendering processor provided in the external device may execute rendering processing.

The technical scope of the present invention is not limited to the modes described in the above-mentioned embodiments and the like. At least one of the elements described in the above-mentioned embodiments and the like may be omitted. The elements described in the above-mentioned embodiments and the like may be combined as appropriate. To the extent allowed by laws, the disclosure of all the literature cited in the above-mentioned embodiments and the like is incorporated herein by reference.

In the above-described embodiments, the reliability calculator may calculate the reliability information on the line information, and the line information adjuster may select, based on the reliability information on the line information, information to be included in the second object information from the line information.

In the above-described embodiments, the line information adjuster may decrease, in the second object information, the number of lines included in the line information to be smaller than in the first object information.

In the above-described embodiments, the reliability calculator may calculate the reliability information on the surface information, and the surface information adjuster may select, based on the reliability information on the surface information, information to be included in the second object information from the surface information.

In the above-described embodiments, the surface information adjuster may decrease, in the second object information, the number of surfaces included in the surface information to be smaller than in the first object information.

In the above-described embodiments, the texture information adjuster may reduce the number of colors used for the texture information on at least a part of the object in the second object information to be smaller than in the first object information.

DESCRIPTION OF REFERENCE SIGNS 1 detection device, 2 detector, 3 reliability calculator, 4 information calculator, 5 information processor, 11 imager, 12 distance measurer, 21 point cloud data generator, 22 surface information generator, 23 texture information generator, 25 line information generator, 26 surface information generator, 31 depth information adjuster, 32 point cloud data adjuster, 33 line information adjuster, 34 surface information adjuster, 35 texture information adjuster

What is claimed is:

1. An imaging system comprising:
   a first imaging device having:
   a first detector that detects a first detection area including an object;
   a first reliability calculator that calculates first reliability information that indicates a first reliability of a plurality of first detection points in the first detection area; and
   a first information calculator that uses first data of the plurality of first detection points to calculate first model information of the object;
   a second imaging device having:
   a second detector that detects a second detection area including the object;
   a second reliability calculator that calculates second reliability information that indicates a second reliability of a plurality of second detection points in the second detection area; and
   a second information calculator that uses second data of the plurality of second detection points to calculate second model information of the object; and
   an information processing device provided external to the first imaging device and the second imaging device, and including a model integrator that integrates the first model information and the second model information based on the first reliability information and the second reliability information to generate integrated model information.

2. The imaging system according to claim 1, wherein the first detector includes a first distance measurer that detects a first distance from a first viewpoint to a first point on the object, and
   the second detector includes a second distance measurer that detects a second distance from a second viewpoint to a second point on the object.

3. The imaging system according to claim 1, wherein:
   the first imaging device further includes
   a first distance measurer that detects a first distance from a first viewpoint to a point on the object; and
   a first point cloud data generator that uses first depth information obtained from a first detection result of the first distance measurer to generate first point cloud data on the object;
   the second imaging device further includes
   a second distance measurer that detects a second distance from a second viewpoint to the point on the object; and
   a second point cloud data generator that uses second depth information obtained from a second detection result of the second distance measurer to generate second point cloud data on the object, and
   the model integrator uses the first point cloud data and the second point cloud data to generate integrated model information.

4. The imaging system according to claim 3, wherein the first reliability calculator calculates the first reliability information on the first point cloud data, and
   the second reliability calculator calculates the second reliability information on the second point cloud data.

5. The imaging system according to claim 1, wherein the first information calculator includes a first surface information generator that generates, based on first detection results of the first detector, first surface information including first coordinates of a plurality of first points on the object and first connection information among the first points, and
   the second information calculator includes a second surface information generator that generates, based on second detection results of the second detector, second surface information including second coordinates of a plurality of second points on the object and second connection information among the second points.

6. The imaging system according to claim 5, wherein the first surface information generator includes a first line information generator that generates first line information on a first line connecting two first points on the object, and
   the second surface information generator includes a second line information generator that generates second line information on a second line connecting two second points on the object.

7. The imaging system according to claim 6, wherein the first surface information generator includes a first surface information generator that generates information on a first surface surrounded by three or more first lines on the object, and
   the second surface information generator includes a second surface information generator that generates information on a second surface surrounded by three or more second lines on the object.

8. The imaging system according to claim 1, wherein the first reliability information has a plurality of first reliabilities, and the first reliabilities are based on a distance from the first detector to the object, and
   the second reliability information has a plurality of second reliabilities, and the second reliabilities are based on a distance from the second detector to the object.

9. The imaging system according to claim 1, wherein the first reliability information is first reference data in which a first reliability of each first data point in the first point cloud data corresponds to the first data point, the second reliability information is second reference data in which a second reliability of each second data point in second point cloud data corresponds to the second data point.

10. The imaging system according to claim 1, wherein
the first reliability information has a first data structure in which grayscale values of pixels in the first detector and the first reliability are paired, and
the second reliability information has a second data structure in which grayscale values of pixels in the second detector and the second reliability are paired.

11. The imaging system according to claim 1, wherein
the first reliability calculator calculates the first reliability information based on at least one of first optical characteristics of a first optical system provided in the first detector, a first distance from a first viewpoint of the first detector to the object, and a first difference between a first normal vector of the object and a first direction of the first viewpoint, and
the second reliability calculator calculates the second reliability information based on at least one of second optical characteristics of a second optical system provided in the second detector, a second distance from a second viewpoint of the second detector to the object, and a second difference between a second normal vector of the object and a second direction of the second viewpoint.

12. The imaging system according to claim 11, wherein
the first optical characteristic includes a first aberration of the first optical system,
the first reliability calculator calculates the first reliability information based on a first distance from the center of the visual field at the first viewpoint
the second optical characteristic includes a second aberration of the second optical system, and
the second reliability calculator calculates the second reliability information based on a second distance from the center of the visual field at the second viewpoint.

13. The imaging system according to claim 1, wherein
the first reliability calculator calculates the first reliability information based on first parameters according to first positions of the plurality of first detection points in the first detection area, and
the second reliability calculator calculates the second reliability information based on second parameters according to second positions of the plurality of second detection points in the second detection area.

14. An information processing device comprising:
a processor programed to
receive, from a first external imaging device, (i) first model information of an object, the first model information being calculated based on first data of a plurality of first detection points in a detected first detection area including the object and (ii) first reliability information that indicates a first reliability of the plurality of first detection points in the first detection area;
receive, from a second external imaging device, (i) second model information of the object, the second model information being calculated based on second data of a plurality of second detection points in a detected second detection area including the object and (ii) second reliability information that indicates a second reliability of the plurality of second detection points in the second detection area; and
integrate the first model information and the second model information based on the first reliability information and the second reliability information to generate integrated model information.

15. A detection method, comprising:
detecting, using a first imaging device, a first detection area including an object;
calculating, using the first imaging device, first reliability information that indicates a first reliability of a plurality of first detection points in the first detection area;
calculating, using the first imaging device, first model information of the object using first data of the plurality of first detection points;
detecting, using a second imaging device, a second detection area including the object using a second imaging device;
calculating, using the second imaging device, second reliability information that indicates a second reliability of a plurality of second detection points in the second detection area;
calculating, using the second imaging device, second model information of the object using second data of the plurality of second detection points using the second imaging device; and
integrating, using an information processing device provided external to the first imaging device and the second imaging device, the first model information and the second model information based on the first reliability information and the second reliability information to generate integrated model information.

16. A non-transitory computer readable medium including a detection program that causes a computer to execute processes including:
receiving, from a first external imaging device, (i) first model information of an object, the first model information being calculated based on first data of a plurality of first detection points in a detected first detection area including the object and (ii) first reliability information that indicates a first reliability of the plurality of first detection points in the first detection area;
receiving, from a second external imaging device, (i) second model information of the object, the second model information being calculated based on second data of a plurality of second detection points in a detected second detection area including the object and (ii) second reliability information that indicates a second reliability of the plurality of second detection points in the second detection area; and
integrating the first model information and the second model information based on the first reliability information and the second reliability information to generate integrated model information.

* * * * *